(12) United States Patent
Melton

(10) Patent No.: US 12,211,099 B2
(45) Date of Patent: **\*Jan. 28, 2025**

(54) FAIR CREDIT SCREENED MARKET DATA DISTRIBUTION

(71) Applicant: Refinitiv US Organization LLC, New York, NY (US)

(72) Inventor: Hayden Paul Melton, Philadelphia, PA (US)

(73) Assignee: Refinitiv US Organization LLC, New York, NY (US)

( * ) Notice: Subject to any disclaimer, the term of this patent is extended or adjusted under 35 U.S.C. 154(b) by 294 days.

This patent is subject to a terminal disclaimer.

(21) Appl. No.: 17/840,295

(22) Filed: Jun. 14, 2022

(65) Prior Publication Data

US 2022/0309583 A1 Sep. 29, 2022

Related U.S. Application Data

(63) Continuation-in-part of application No. 17/750,995, filed on May 23, 2022, now Pat. No. 11,869,083, (Continued)

(51) Int. Cl.
*G06Q 40/04* (2012.01)

(52) U.S. Cl.
CPC .................. *G06Q 40/04* (2013.01)

(58) Field of Classification Search
CPC .................................. G06Q 40/04
See application file for complete search history.

(56) References Cited

U.S. PATENT DOCUMENTS

| 7,055,030 B2 | 5/2006 | Negawa |
| 7,333,610 B2 | 2/2008 | Dallard |

(Continued)

FOREIGN PATENT DOCUMENTS

| CA | 2422153 | 9/2003 |
| CN | 1988690 | 6/2007 |

(Continued)

OTHER PUBLICATIONS

"Overview of IP Multicast", Cisco White Paper, printed from http://www.cisco.com/en/US/tech/tk828/technologies_white_paper09186a0080092942.shtml, Accessed Nov. 10, 2013, 5 pages.

(Continued)

*Primary Examiner* — John W Hayes
*Assistant Examiner* — Zehra Raza
(74) *Attorney, Agent, or Firm* — Sheppard Mullin Richter & Hampton LLP

(57) ABSTRACT

The invention relates to systems and methods for distributing encrypted market data updates to market participants via private multicast channels. Among other factors, characteristics of modern computer networks may cause participants to be sent (and to receive) their encrypted data for that update at different times. Thus, after the participants have all been sent their data for that update the system may then simultaneously transmit to those participants the key that will enable them to decipher their data via a public multicast channel such that all recipients receive the key at the same time. In this manner the invention may ensure that although participants receive their data in a given update at different times, they are unable to decipher that data until substantially the same time.

18 Claims, 13 Drawing Sheets

Related U.S. Application Data which is a continuation of application No. 14/535,776, filed on Nov. 7, 2014, now Pat. No. 11,341,572.

(60) Provisional application No. 61/901,551, filed on Nov. 8, 2013.

(56) References Cited

U.S. PATENT DOCUMENTS

| | | |
|---|---|---|
| 7,636,683 B1 | 12/2009 | Mills |
| 8,010,450 B2 | 8/2011 | Palmer |
| 8,416,801 B2 | 4/2013 | Howorka |
| 8,504,667 B2 | 8/2013 | Howorka |
| 2002/0097878 A1 | 7/2002 | Ito |
| 2002/0120837 A1 | 8/2002 | Maxemchuk |
| 2003/0046539 A1 | 3/2003 | Negawa |
| 2003/0126056 A1 | 7/2003 | Hausman |
| 2004/0001087 A1 | 1/2004 | Warmus |
| 2004/0019553 A1 | 1/2004 | Setz |
| 2004/0059668 A1 | 3/2004 | Togher |
| 2004/0101138 A1 | 5/2004 | Revital |
| 2004/0260839 A1 | 12/2004 | Onoda |
| 2006/0059079 A1 | 3/2006 | Howorka |
| 2009/0276503 A1 | 11/2009 | Renger |
| 2012/0102523 A1 | 4/2012 | Herz |
| 2012/0250865 A1 | 10/2012 | Terpstra |
| 2015/0134533 A1 | 5/2015 | Melton |

FOREIGN PATENT DOCUMENTS

| | | |
|---|---|---|
| CN | 102395113 | 3/2012 |
| JP | 1127252 | 1/1999 |
| WO | 0191465 | 11/2001 |
| WO | 0198903 | 12/2001 |

OTHER PUBLICATIONS

Chan, Aldar C-F., et al. "Scalable, Server-Passive, User-Anonymous Timed Release Cryptography," Proceedings of the 25th IEEE International Conference on Distributed Computing Systems (ICDCS'05), IEEE, 2005, 10 pages.

Nowlan, Michael F., "A Wire-Compatible TCP Implementation for Low-Latency Applications", Doctoral Dissertation, Yale University, 2014, 92 pages.

Molvizadah, Vasiq, "Analyzing FTP Traffic . . . Overview of FTP Communications", Retrieved from the Internet: <URL: https://medium.com/@vasiqmz/analyzing-ftp-traffic-cfd1b18bf30a>, [retrieved on Oct. 28, 2022], Jan. 2, 2018 (Jan. 2, 2018), XP055975880,, pp. 1-6.

FAIR CREDIT SCREENED MARKET DATA DISTRIBUTION

CROSS-REFERENCE TO RELATED APPLICATIONS

This application is a continuation in part of U.S. patent application Ser. No. 17/750,995, filed May 23, 2022, entitled "FAIR CREDIT SCREENED MARKET DATA DISTRIBUTION", which is a continuation of U.S. patent application Ser. No. 14/535,776, filed Nov. 7, 2014, entitled "FAIR CREDIT SCREENED MARKET DATA DISTRIBUTION" (which issued as U.S. Pat. No. 11,341,572 on May 24, 2022), which claims priority to U.S. Provisional Patent Application Ser. No. 61/901,551, filed Nov. 8, 2013, entitled "FAIR CREDIT SCREENED MARKET DATA DISTRIBUTION," the contents of all of which are incorporated by reference in their entirety herein.

FIELD OF THE INVENTION

The invention relates to systems and methods for distributing market data from an electronic trading venue.

BACKGROUND OF THE INVENTION

Many electronic trading venues operate central limit order books (CLOBs) for the instruments that trade on them. Orders for a given instrument from market participants are processed against that instrument's CLOB. The CLOB's state manifests as the bid (buy) and offer (sell) orders it contains, which are typically arranged by side, price and time of receipt. As such, each order may cause the CLOB to change its state. The order can cause the state of the CLOB to change as a result of a match (an existing buy order being matched with a newly received sell order, and vice versa), a cancellation (a removal of an order), an amendment (a change in order's price or quantity), or a new order being "inserted" into the CLOB as a bid or offer.

On a given venue, the state of an instrument's CLOB may be reflective of the market supply and demand for that instrument. Since market participants' decisions to buy and sell an instrument are informed at least in part by the prevailing supply and demand for that instrument, many electronic trading venues operate so as to disseminate a view of the CLOB to the market participants on that venue. This view of the CLOB is disseminated in so-called market data updates. The precise nature of the view and the specific mechanism by and frequency at which the view is disseminated as market data updates varies by venue. But since supply and demand changes with respect to time, and since market participants need a contemporaneous view of supply and demand on which to inform their trading decisions, over a long time horizon an electronic trading venue will tend to send out a very large number of market data updates.

On some electronic trading venues, at any given market data update, the same view of the CLOB will be transmitted to all interested market participants. In other words, information from the market data update will be the same for all interested market participants. Thus, a point-to-multipoint or one-to-many communication protocol can be used to transmit this information from the venue to all interested market participants. To this end, on many real-life electronic trading venues, especially in the equities and futures markets, where the same view of the CLOB is transmitted to all interested market participants, the IP Multicast protocol is used.

However, on other electronic trading venues, it is not possible (or not practical) to send the same view of the CLOB to all interested market participants at a given market data update. In the spot foreign exchange (spot FX) market, for example, there is generally no central counterparty against which all market participants trade. Instead trades occur based on bilateral credit relationships among the market participants. If a market participant wishes to see a view of the CLOB containing only the orders against which the market participant can actually trade, then in generating that view orders in the CLOB submitted by other participants with whom the market participant does not have bilateral credit must be excluded (or equivalently "screened") from the view. Since the credit a participant extends, and that which is extended to them generally varies across all pairs of participants, the credit screened (herein simply "screened") view of the CLOB is generally different per market participant, even when those views are all taken from the same point-in-time state of the CLOB. From a computer networking perspective, when generally different data has to be sent to different recipients, a point-to-point or one-to-one communication protocol may be used to transmit a market data update from the venue to all interested market participants. To this end, on many electronic trading venues where it is necessary to send different views of the CLOB to different participants within the same market data update, the TCP/IP protocol is used.

Operators of electronic trading venues have obligations to ensure fairness in their venues. One aspect of fairness is ensuring market data updates are received by (or at least sent to) market participants at substantially the same time. It is understood and widely-accepted that in an appropriately designed computer network, where the length of cables and network devices connecting each recipient to the sender of the data are the same across all recipients, IP Multicast can ensure all recipients receive each piece of data sent by the sender at substantially the same time. In this regard, operators of electronic trading venues in which the same view of the CLOB is sent to all market participants at each market data update can more easily ensure fairness in market data distribution. However, on electronic trading venues in which a different view of the CLOB is sent to each participant at each market data update, achieving fairness in market data distribution is more difficult.

Modern computer networks serialize data and in doing so impose a total ordering of the data being sent. As a result of this property of computer networks, a system intended to transmit data in a point-to-point manner to a plurality of recipients "all at once" may, in fact, fail to provide all recipients with data at the same time. With respect to sending different views of the CLOB to different market participants, and depending on the bandwidth of the network, size in bytes of the views and number of participants to which the views are being sent, this approach to sending all data "all at once" could result in 100's of microseconds ($\mu$s) or even several milliseconds elapsing between the first market participant's view of the CLOB being sent at a given market update, and the last participant's view of the CLOB being sent at that same update. In the context of market data distribution, this is not fair. To run a fair market, market participants should have access to prices at the same time. These and other drawbacks exist.

SUMMARY OF THE INVENTION

The invention addressing these and other drawbacks relates to systems and methods for ensuring that data distributed to multiple recipients is accessible by all of the recipients at substantially the same time, regardless of when the data is actually received by each recipient. For example, a system may distribute data encoded in a manner that is inaccessible (e.g., encrypted) without additional information (e.g., an encryption key used to encrypt/decrypt the data). Thus, a recipient who receives the data before another recipient may be unable to access or otherwise read the data without the additional information, preventing the recipient from taking advantage of having received the data before other recipients. The system may distribute the additional information at a time that is common to all of the recipients so that each recipient may decipher (or decrypt) the data at substantially the same time as the other recipients. For example, once the system has distributed the data to each of the recipients, the system may provide the additional information to each of the recipients at substantially the same time.

An exemplary use of the system relates to distribution of information for a market data update relating to a financial instrument to market participants. A market data update may indicate the prevailing supply and demand (e.g., as indicated by buy and/or sell orders in a CLOB) at a given time for a given instrument, that market participants may use to gauge whether to buy or sell the instrument.

In some instances, information from a market data update may be uniquely screened for a given market participant. For example, the system may determine a market participant's credit (e.g., ability to execute trades with other parties) and generate credit screened market data based on the market data update and the market participant's credit. The system may likewise perform such screening for other market participants using the market data update and the other market participants' credit. As such, credit screened market data based on a market data update may be generated for and distributed to a market participant sooner than other credit screened market data for another market participant. In these instances, the system may ensure that each market participant may access its own credit screened market data relating to an instrument only after other market participants have likewise received (or have been sent) their respective credit screened market data relating to the instrument.

The systems and methods will be described herein with respect to credit screened market data for clarity of illustration and not limitation. For example, the system may be used in other contexts to ensure that data distributed to multiple recipients (whether or not completely unique to each recipient) and received at different times is made accessible at substantially the same time for all recipients. Furthermore, the system may be used to ensure that different data provided to a single recipient is accessible by that recipient at the same time. For instance, the system may provide first data to a recipient at a first time and second data to the recipient at a second time. Both the first data and the second data may be inaccessible without additional information. The system may provide the additional information to the recipient so that the recipient may access (or decode, or decipher) the first data and the second data only after the additional information is provided. Having described a high level overview of exemplary system functions, attention will now be turned to an example of encoding the data provided to recipients.

Encrypting Credit Screened Market Data and Delaying the Provision of Encryption Keys to Market Participants In an implementation, the additional information required to access credit screened market data may include an encryption key. For example, the system may generate an encryption key (e.g., an initially secret random key) used to encrypt the credit screened market data before distributing the credit screened market data to the market participants.

Because each credit screened market data is encrypted, even if a market participant receives its credit screened market data before other market participants, the market participant will be unable to decipher the contents of the credit screened market data until the system provides (and the market participant receives) the encryption key.

After the system has distributed the encrypted credit screened market data to each market participant, the system may provide the encryption key to all of the market participants (substantially simultaneously) to whom encrypted credit screened market data were distributed.

In an implementation, the system may provide the encryption key via a multicast (e.g., one-to-many or many-to-many distribution) transport protocol, which transmits the encryption key to the market participants at the same time (or substantially the same time).

In an implementation, the system may provide the encryption key to the market participants only after occurrence of predetermined criteria. For example, the system may provide the encryption key to market participants only after it has been confirmed that encrypted credit screened market data has been transmitted to (e.g., "put on the wire") and/or received by all market participants that were to receive respective encrypted credit screened market data. In this manner, the system may ensure that all market recipients have received their respective encrypted credit screened market data before providing an encryption key used to decrypt the credit screened market data.

Distributing Market Updates in Parallel and Synchronizing Provision of Encryption Keys In an implementation, because the volume of market data updates may be (and typically is) high, the system may employ a plurality of credit screening processes (herein simply "screeners") that are executed in parallel to minimize processing times. Processes may be divided among the screeners in various ways. For example, each screener may be responsible for generating a market data update for a subset of market participants, performing credit screening using the CLOB and bilateral credit relationships among the subset of participants as input to that process, and generating and distributing credit screened market data to its respective set of market participants using point-to-point transmission schemes. Alternatively, each screener may be responsible for generating market data updates and performing credit screening among participants on a subset of instruments being traded and distributing appropriate credit screened market data to relevant market participants using private multicast transmission schemes according to defined transmission preferences. In either case, the system may generate a single encryption key for each market data update, either centrally for provision to the screeners, or by providing relevant information for key generation at each screener, so that the screeners may each encrypt the credit screened market data using the encryption key prior to distribution to the market participants.

In various implementations, the market data updates may be sent directly from a screener to a market participant via a point-to-point communication protocol. In another implementation, the market data updates may be sent from screeners to market participants over private multicast channels. In such an implementation, the private multicast channels may be configured by the system and/or market participant on a participant-by-participant basis.

The system may synchronize provision of the encryption key to market participants based on whether each of the screeners have provided encrypted credit screened market data to the relevant market participants. In other words, the system may provide the encryption key to market participants only when the encrypted credit screened market data has been transmitted to and/or received by all of the market participants that should have been provided with respective encrypted credit screened market data.

The system may determine whether the encrypted credit screened market data were provided to market participants in various ways. For example, the system may provide the encryption key only after each screener has verified that it has distributed the encrypted credit screened market data to relevant market participants. In another example, a downstream listener may detect when a screener has provided encrypted credit screened market data to a market participant and report such detection to the system. Similarly, the market participants themselves may indicate receipt of encrypted credit screened market data.

Mapping Market Updates with Corresponding Encryption Keys

In an implementation, the system may associate the encrypted credit screened market data with an encryption key used to encrypt the credit screened market data. The encrypted credit screened market data may therefore be unambiguously mapped to a given encryption key used to encrypt the market update (and vice versa) based on the association. The system may associate encrypted credit screened market data with an encryption key in various ways. For example, the system may prepend or append a clear text string that is not encrypted to both the encrypted credit screened market data and the encryption key. In this manner, the clear text string may be used to associate the encrypted credit screened market data with the encryption key. In another example, the system may store a table that associates an identifier (e.g., a filename) of the encrypted credit screened market data with an identifier of a corresponding encryption key.

In whichever manner the system associates the encrypted credit screened market data with an encryption key, the system may use the association to identify an encryption key used to encrypt the encrypted credit screened market data and vice versa. For example, the system may receive a request, from a market participant, to provide an encryption key for the encrypted credit screened market data identified in the request. This may occur in implementations in which the encryption key is provided via a multicast transport protocol or other non-reliable network protocol in which delivery of data is not guaranteed, a market participant may not have received the encryption key. Responsive to the request, the system may identify the appropriate encryption key based on an association between the encrypted credit screened market data and the appropriate encryption key. If the encryption key has already been provided to other market participants, the system may provide the encryption key to the requesting market participant. On the other hand, if the encryption key has not been provided to other market participants, the system may deny the request.

Using the system described herein, a market participant may be provided with its credit screened market data that is accessible only when other market participants have also been provided with their respective credit screened market data, regardless of when the credit screened market data is actually transmitted to and/or received by each recipient.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF THE INVENTION

Figure 1:
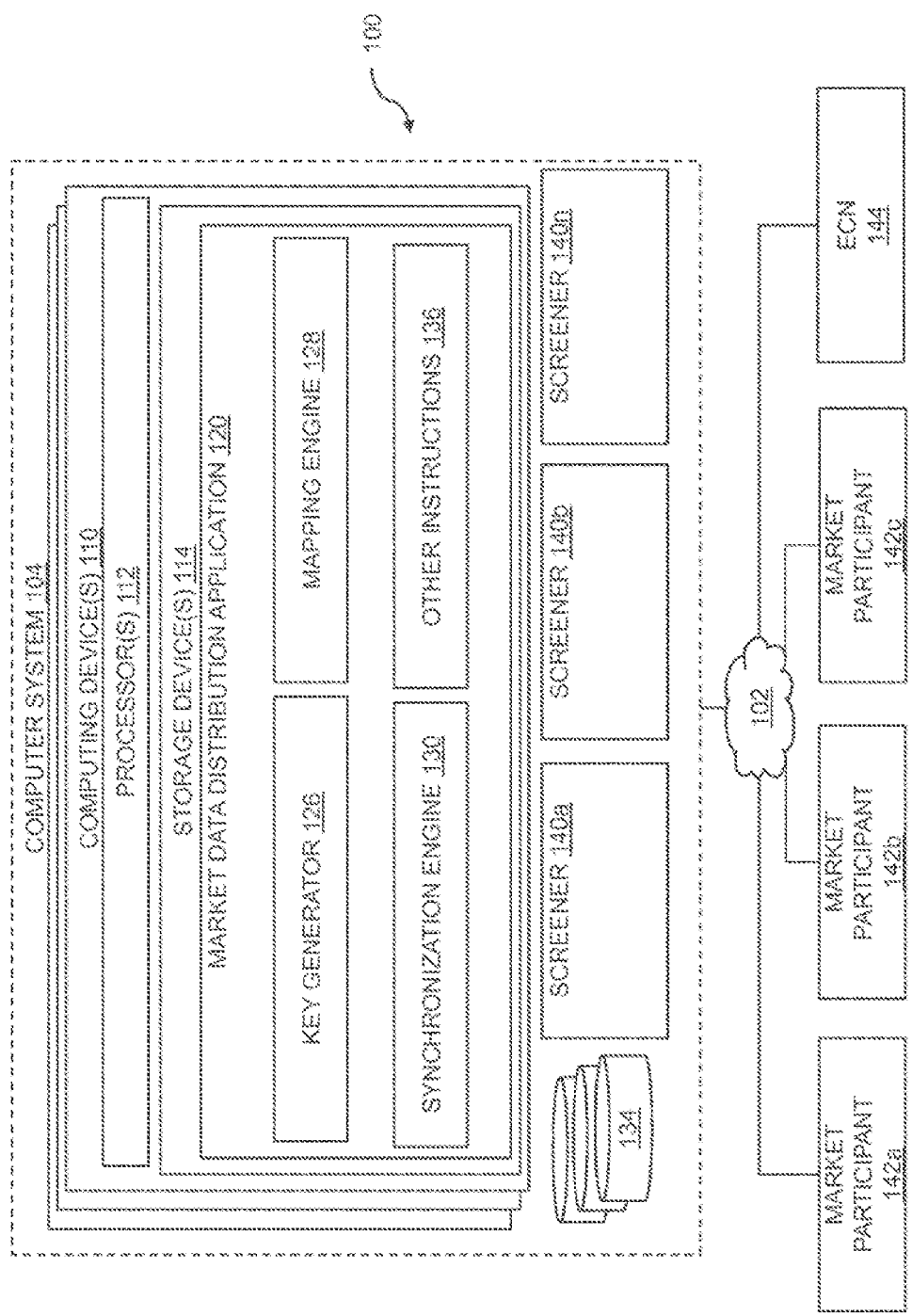
FIG. 1 illustrates a system for distributing fair credit screened market data, according to an implementation of the invention.

FIG. 1 illustrates a system 100 for distributing credit screened market data, according to an implementation of the invention. System 100 may distribute data encoded in a manner that is inaccessible (e.g., encrypted) without additional information (e.g., an encryption key used to encrypt/ decrypt the data). Although described herein using examples of encryption, other conventional data obfuscation techniques may be used as well.

A recipient who receives the data before another recipient may be unable to access or otherwise read the data without the additional information, preventing the recipient from taking advantage of having received the data before other recipients. The system may distribute the additional information at a time that is common to all of the recipients so that each recipient may decipher the data at substantially the same time as the other recipients. For example, once the system has distributed the data to each of the recipients, the system may provide the additional information to each of the recipients at substantially the same time.

System 100 may be used to distribute credit screened market data to market participants, although alternative uses of system 100 will be apparent using the disclosure herein. System 100 may encrypt all or a portion of the credit screened market data utilizing an encryption key, such as a random encryption key. System 100 may transmit the encrypted credit screened market data to the market participants. Because the credit screened market data is encrypted, the market participants are unable to decrypt the credit screened market data without the encryption key. As such, without the encryption key, a market participant that receives the encrypted credit screened market data before another market participant will be unable to access the credit screened market data before the other market participant.

System 100 may determine that each of the market participants have received the encrypted credit screened market data (or at least that the encrypted credit screened market data has been transmitted to each of the market participants). For example, system 100 may receive an express acknowledgement of receipt from each market participant, detect that the encrypted credit screened market data has been transmitted to each market participant, receive an indication from one or more components responsible for transmitting the encrypted credit screened market data to the market participants, and/or otherwise determine that each of the market participants have received the encrypted credit screened market data.

Upon a determination that the encrypted credit screened market data has been transmitted to and/or received by each of the market participants, system 100 may simultaneously transmit the encryption key associated with the encrypted credit screened market data to all of the market participants. For example, system 100 may transmit the encryption key simultaneously to the market participants using a one-to-many or many-to-many distribution protocol (e.g., IP Multicast). Upon receipt of the encryption key, each market participant may decrypt and decipher the credit screened market data, which may include its credit screened prices and quantities for a financial instrument.

Having described a high level overview of some of the system functions, attention will now be turned to various system components that facilitate these and other functions.

System Components

System 100 may include a computer system 104, one or more computing devices 110, one or more databases 134, one or more screeners 140 a, 140 b, . . . , 140 n, one or more market participant devices 142 a, 142 b, . . . , 142 n, a trading system's electronic communication network (ECN) 144, and/or other components. Each computing device 110 may include one or more processors 112, one or more storage devices 114, and/or other components. Processor(s) 112 may be programmed by one or more computer program instructions, which may be stored in storage device(s) 114. The one or more computer program instructions may include, without limitation, market data distribution application 120. Market data distribution application 120 may itself include different sets of instructions that each program the processor(s) 112 (and therefore computer system 104). For example, market data distribution application 120 may include an key generator 126, a mapping engine 128, a synchronization engine 130, and/or other instructions 136 that program computer system 104. Screeners 140 may each relate to processes executing on computer system 104. As such, market data distribution application 120 may include instructions that cause screeners 140 to execute on one or more physical processors. As used herein, for convenience, the various instructions will be described as performing an operation, when, in fact, the various instructions program computer system 104 to perform the operation.

Figure 2:
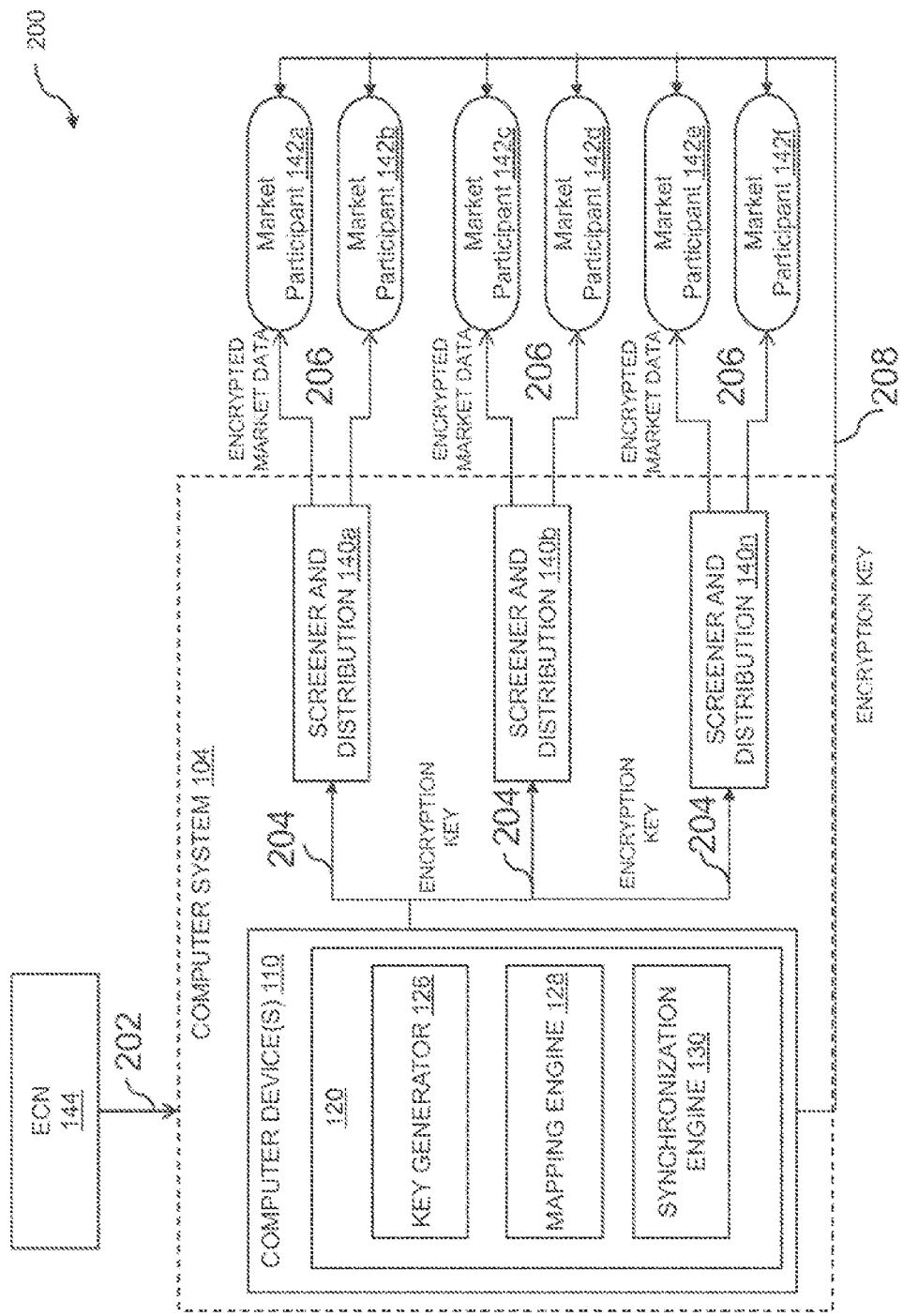
FIG. 2 depicts a flow diagram for components of a system that facilitates distribution of credit screened market data, according to an implementation of the invention.

FIG. 2 depicts a flow diagram 200 for components of system 100 that facilitate distribution of credit screened market data, according to an implementation of the invention. The various processing operations and/or data flows depicted in FIG. 2 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 202, market data distribution application 120 may receive CLOB state information associated with a financial instrument and credit relationship information from ECN 144 and/or other information source. The CLOB state information may reflect the prevailing price and quantity information of a given financial instrument at a given point in time. The credit relationship information may reflect credit relationships among different parties at the given point in time.

Generating and Encrypting Credit Screened Market Data

In an implementation, key generator 126 may generate an encryption key used to encrypt data relating to the CLOB state information at the given point in time. For example, key generator 126 may generate an encryption key used to encrypt data each time that CLOB state information for a given financial instrument is received. An encryption key may generally refer to a piece of information (e.g., a random number, a hash, a parameter, etc.) that determines the functional output of a process used to encrypt data.

In an operation 204, market data distribution application 120 may provide each screener 140 with the encryption key, the CLOB state information, and the credit relationship information. In an implementation, each screener 140 is responsible for its own set of market participants 142 for which it must perform credit screening. For example, screener 140A may parse the credit relationship information relevant to market participant 142A. Screener 140A may determine actual trades that market participant 142A can execute for a financial instrument based on the parsed portions. Screener 140A may generate credit screened market data based on and CLOB state information and the actual trades that market participant 142A can make. For instance, the credit screened market data for market participant 142A may include a top of book bid/offer for a spot FX instrument (formatted as quantity@price) of 5M@1.0001/3M@1.0002 on a given instrument at a given point in time, whereas, for the same point in time and the same instrument, the credit screened market data for market participant 142B may include a bid/offer of 3M@1.0001/1M@1.0003.

Screener 140A may perform the foregoing for market participant 142B and any other market participants 142 for which screener 140A is responsible. Screener 140B and/or other screeners 140N may likewise generate credit screened market data for their respective market participants 142C-F as well.

Each screener 140 may encrypt each credit screened market data using the encryption key prior to transmission to an intended market participant 142. Such encryption may use the Advanced Encryption Standard (AES), or may be an XOR cipher used as a One Time Pad, or some other encryption standard or technique. All screeners may use the same encryption key (received from key generator 126) for encrypting credit screened market data. Of course, this encryption key will be replaced by a new encryption key when new CLOB state information is received.

Transmitting the Encrypted Credit Screened Market Data

In an operation 206, each screener 140 may transmit the encrypted credit screened market data to respective market participants. Such transmission may employ a point-to-point communication protocol such as, without limitation, TCP/IP. Because of the nature of point-to-point protocols, as well as the customized nature in which each market recipient 142 is provided with credit screened market data, a given market participant 142 may receive its credit screened market data before another market participant. However, because each credit screened market data is encrypted prior to transmission, the given market participant 142 may not decrypt the encrypted credit screened market data without the encryption key. It should be noted that, in some implementations, a given screener 140 may transmit all of its encrypted credit screened market data to its market participants 142 at the same time using a point-to-multipoint or multipoint-to-multipoint transport protocol as well.

Reducing Peak Bandwidth During Transmission

In an implementation, one or more screeners 140 may, individually or collectively, delay transmission of the encrypted credit screened market data. For example, one or more screeners 140 may store the credit screened market data in a memory and transmit the credit screened market data periodically (e.g., every 50 milliseconds) between market updates. Doing so may advantageously reduce the amount of peak network traffic that typically occurs after a market update (e.g., after new CLOB state information is published by the venue), which may also result in fewer network errors such as dropped data packets. Thus, the system may leverage the encryption of credit screened market data and delay the transmission of encryption keys described herein to reduce peak network bandwidth usage as well.

Transmitting Encryption Keys

In an operation 208, market update distribution application 120 may obtain an indication that encrypted credit screened market data relating to a given time for a financial instrument has been transmitted to and/or received by each market participant 142 and, responsive to the indication, cause the encryption key used to encrypt the credit screened market data to be provided to each market participant 142.

Synchronizing the Provision of Encryption Keys

In an implementation, because the volume of market updates may be (and typically is) high, synchronization engine 130 may monitor the activity of screeners 140, which may operate in parallel with one another.

Synchronization engine 130 may synchronize provision of the encryption key to market participants based on whether each of the screeners 140 have provided relevant market updates to their respective sets of market participants 142. In other words, synchronization engine 130 may provide the encryption key to market participants 142 only when all of the market participants that should have been provided with market updates have received the market updates (or at least the market updates have been transmitted to all of such market participants).

Synchronization engine 130 may determine whether the encrypted credit screened market data were provided to market participants 142 in various ways. For example, synchronization engine 130 may obtain an indication from each screener 140 that it has distributed encrypted credit screened market data to its respective set of market participants 142. Alternatively or additionally, synchronization engine 130 may obtain an indication from a downstream listener, such as a passive or active network listener (not illustrated in FIG. 2), that it has detected screener 140 has provided encrypted credit screened market data to a market participant 142. Still alternatively or additionally, synchronization engine 130 may obtain an indication from each market participant 142 that it has received the encrypted credit screened market data. In whichever manner or combination of manners the indication is received, synchronization engine 130 may ensure that all market recipients 142 have received their respective encrypted credit screened market data before simultaneously providing an encryption key used to decrypt encrypted market update.

In an implementation, responsive to the indication that all market recipients 142 have received their respective encrypted credit screened market data, market update distribution application 120 may transmit the encryption key to each market participant 142, cause each screener to transmit the appropriate encryption key to each market participant 142, or otherwise make the encryption key available to each market participant 142.

Mapping Market Updates with Corresponding Encryption Keys

In an implementation, mapping engine 128 may associate encrypted credit screen market data with an encryption key used to encrypt credit screened market data. For example, mapping engine 128 may prepend or append a clear text string that is not encrypted to both the encrypted credit screened market data and the encryption key. In this manner, the clear text string may be used to associate the encrypted credit screened market data with the encryption key. In another example, mapping engine 128 may store a table that associates an identifier (e.g., a filename) of the encrypted credit screened market data with an identifier of a corresponding encryption key. In an implementation, mapping engine 128 may store the mapped encryption keys in database 134. For example, each encryption key used to encrypt the credit screened market data associated with the market update may be stored in database 134. It should be noted that key generator 126 may generate a new key for each market data update, for an individual financial instrument, for a set of financial instruments, and/or other groupings of data. Mapping engine 128 may be used to maintain associations of encryption keys and encrypted credit screened market data, regardless of when and how keys are generated.

The mapping between a given encrypted credit screened market data and corresponding encryption key may be used in various ways. For example, synchronization engine 130 may use the mapping to identify an encryption key that corresponds to encrypted credit screened market data that was provided to a given market participant 142. In another example, a market participant 142 may request an encryption key for corresponding encrypted credit screened market data. Market participant 142 may request the encryption key if it has not received an encryption key (e.g., after a timeout period in which it expects to have received the key). Such a market participant 142 may not have received the encryption key because the encryption key has not yet been transmitted to relevant market participants (e.g., some market participants have not yet received their respective encrypted credit screened market data for a financial instrument relating to a given time), or due to a network error, which may result from delivery of encryption key via a non-guaranteed delivery protocol such as multicast.

Since, unlike TCP/IP, the IP Multicast transport protocol does not guarantee delivery, the encryption key may not be faithfully delivered. In these instances, market participant 142 will not receive an encryption key and may request re-delivery by providing the encrypted credit screened data (or identification information such as a filename).

Market data distribution application 120 may identify the appropriate encryption key and determine whether the encryption key has already been provided to other market participants 142. Responsive to a determination that the encryption key has not been provided to other market participants 142, market data distribution application 120 may decline the request (and may provide a message that the encryption key is not yet available). Responsive to a determination that the encryption key has been provided to other market participants 142, market data distribution application 120 may decline the request (and may provide a message that the encryption key is not yet available). On the other hand, if the encryption key has not been provided to other market participants 142, market data distribution application 120 may provide the encryption key to the requesting market participant.

Upon receipt of the encryption key, market participants 142 may decrypt and decipher the credit screened market data including each market participant's credit screened prices and quantities. Multicast may simultaneously transmit one copy of the encryption key via the computer network, and network-related characteristics being equal, the market participants may receive that single copy of the encryption key at substantially same time.

Figure 3:
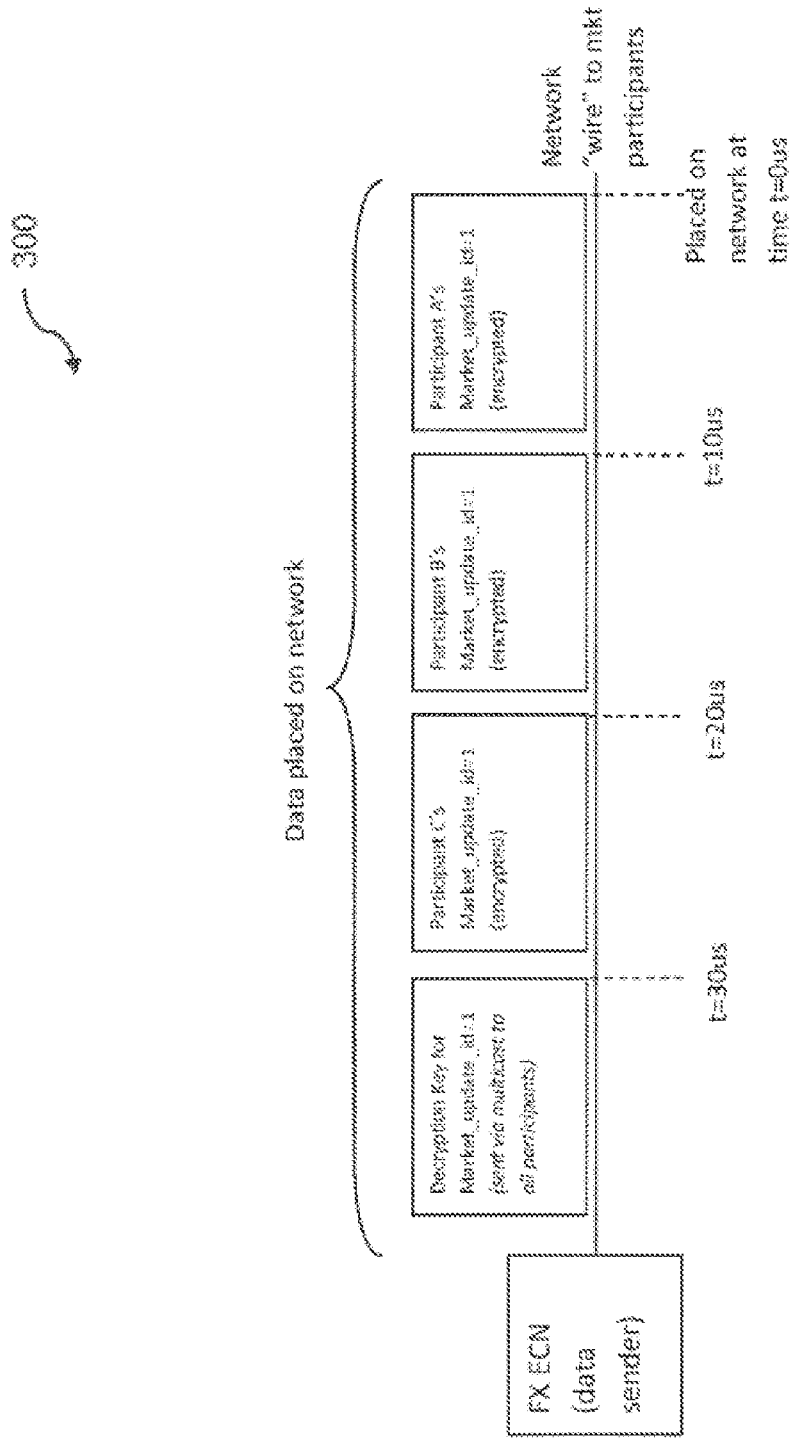
FIG. 3 depicts a data flow diagram for distributing fair credit screened market data, according to an implementation of the invention.

FIG. 3 depicts a data flow diagram 300 for distributing fair credit screened market data, according to an implementation of the invention. The various processing operations and/or data flows depicted in FIG. 3 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In the exemplary data flow 300, encrypted credit screened market data may be transmitted to market participants A, B, and C, and t=0 μs ("μs" being microseconds). At t=0 μs, market participant A may receive the encrypted credit screened market data. At t=10 μs, market participant B may receive the encrypted credit screened market data. At t=20 μs, market participant C may receive the encrypted credit screened market data. Because the credit screened market data is encrypted, market participants A, B, and C are unable to decipher or understand the credit screened market data upon being received. At t=30 μs, market participants A, B, and C may receive the encryption key utilized to encrypt the credit screened market data. Upon receipt of the encryption key, market participants A, B, and C may be able to utilize the encryption key to decipher and understand the encrypted credit screened market data. As shown in the table below, market participants A, B, and C may receive the encrypted credit screened market data at different times, they are able to decipher or understand the credit screened market data at the same time after reception of the encryption key.

Figure 4:
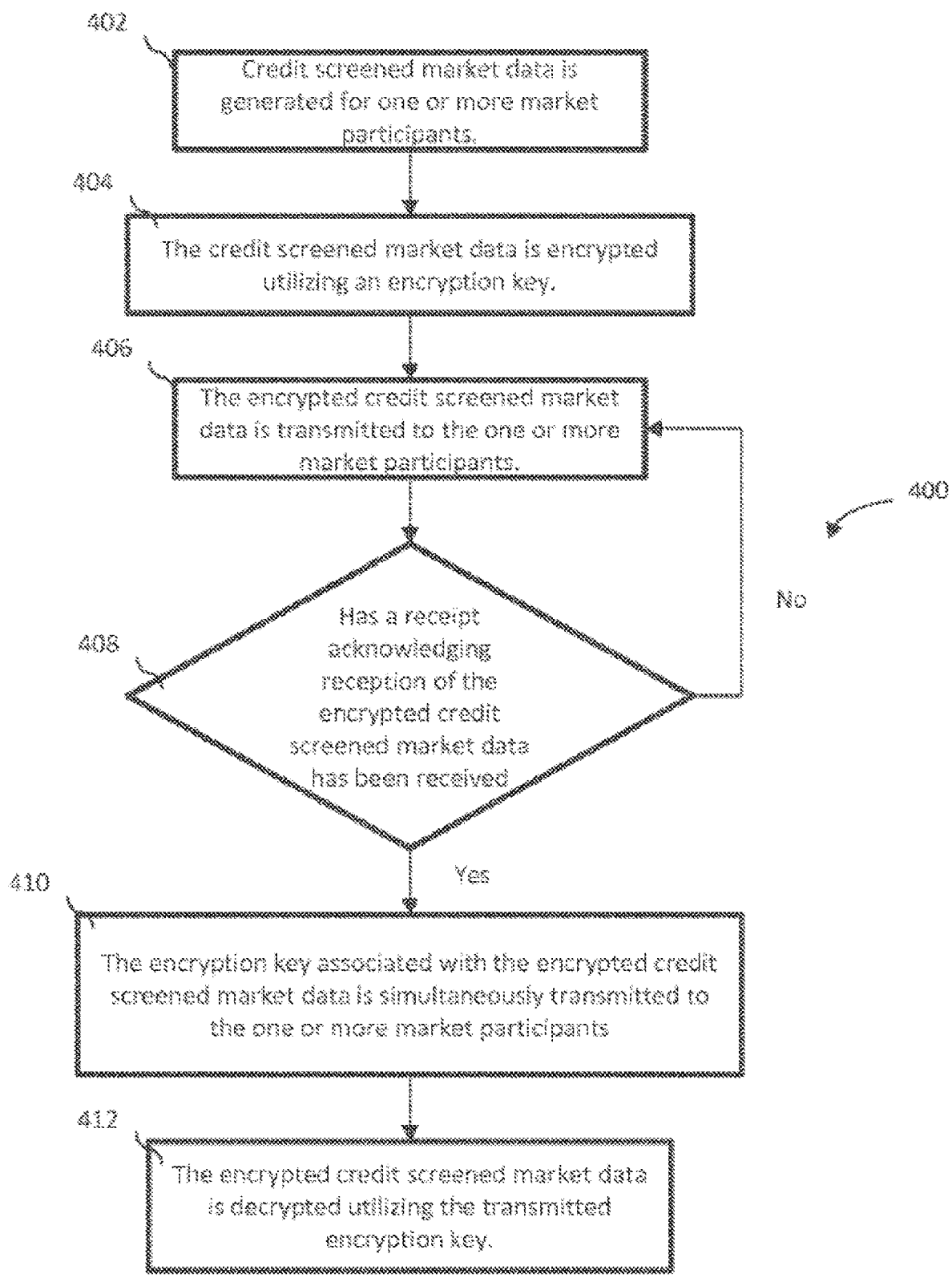
FIG. 4 depicts a process diagram for distributing fair credit screened market data, according to an implementation of the invention.

Time when encrypted market Time when encryption key is Market Participant data is received A t=0 μs t=30 μs B t=10 μs t=30 μs C t=20 μs t=30 μs FIG. 4 depicts a process flow diagram 400 for a process of distributing credit screened market data, according to an implementation of the invention. The various processing operations and/or data flows depicted in FIG. 4 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 402, credit screened market data is generated for one or more market participants. In one implementation, credit screened prices and quantities associated with a financial instrument may be received for one or more market participants from an electronic trading system, such as a FX ECN and generate credit screened market data indicative thereof.

In an operation 404, the credit screened market data is encrypted utilizing an encryption key. For instance, credit screen market data may be encrypted utilizing a data encryption key. For example, a random encryption key may be generated prior to any credit screened prices and quantities updates that may be transmitted to the market participants. The random key may be utilized to encrypt all (or a portion) of the credit screened market data before the credit screened prices and quantities are transmitted to the market participants.

In an operation 406, the encrypted credit screened market data is transmitted to the one or more market participants. In one implementation, the encrypted credit screened market data may be transmitted at predetermined times to the one or more market participants between market updates. Because the credit screened market data is encrypted, market participants are unable to decipher or understand the credit screened market data upon being received.

In an operation 408, it is determined if a receipt acknowledging reception of the encrypted credit screened market data has been received from the one or more market participants.

In an operation 410, in response to receiving a receipt acknowledging reception of the encrypted credit screened market data has been received from the one or more market participants, the encryption key associated with the encrypted credit screened market data is simultaneously transmitted to the one or more market participants. For instance, after the market participants have been sent the encrypted credit screened market data for a given market data update, the encryption key which was utilized to encrypt the credit screened market data, is transmitted to the market participants utilizing a multicast transport protocol. In one implementation, a multicast transport protocol may be utilized to transmit (network-characteristics being equal) the market participants the encryption key at the same time. Upon receipt of the encryption key, the market participants may decrypt and decipher the credit screened market data including each market participant's credit screened prices and quantities.

If a receipt acknowledging reception of the encrypted credit screened market data has not been received from the one or more market participants, the encrypted credit screened market data is re-transmitted to the one or more market participants after a predetermined time period.

In an operation 4120, the encrypted credit screened market data is decrypted utilizing the transmitted encryption key.

Implementations Using Private Multicast Groups

Figure 5:
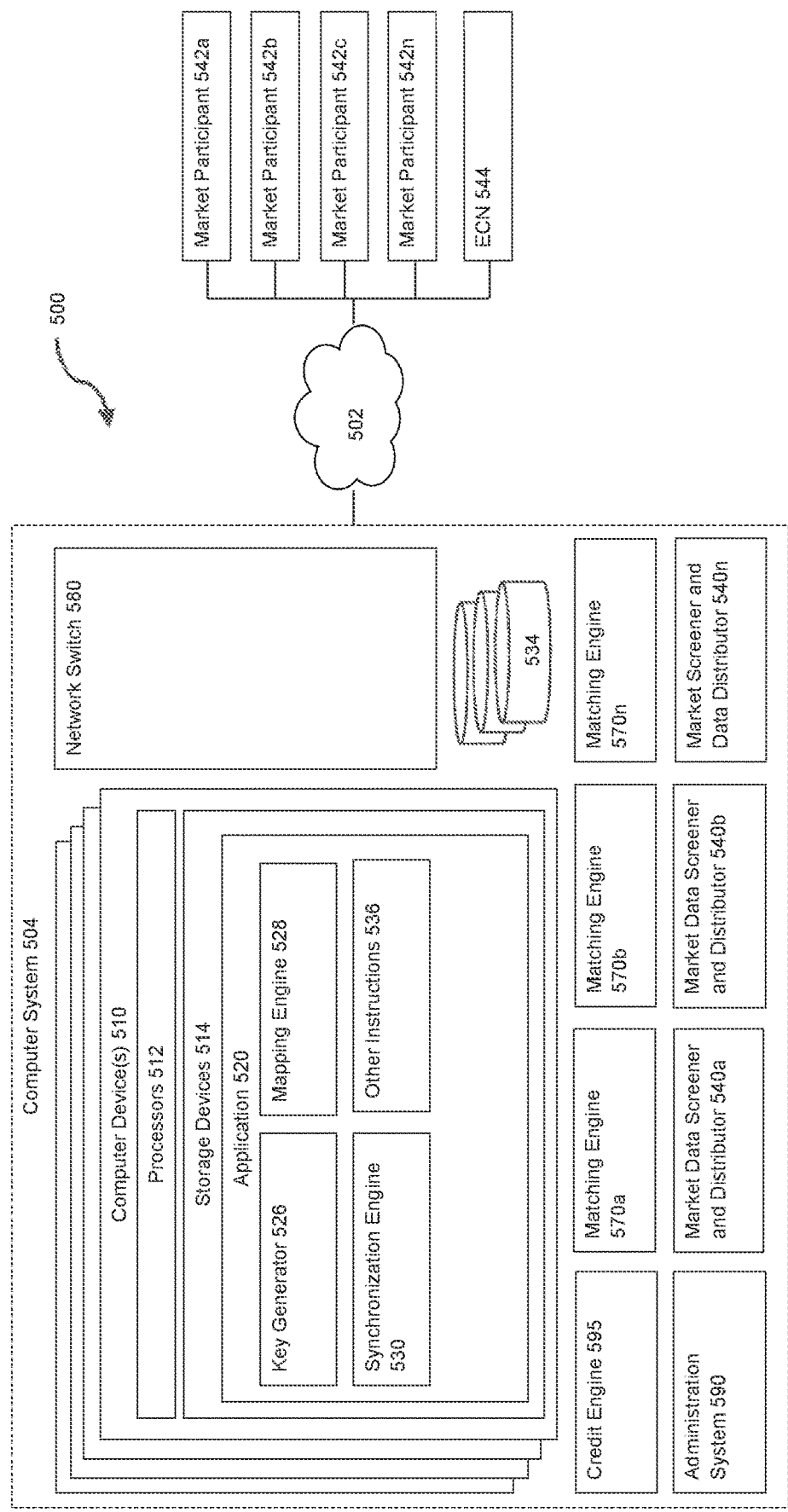
FIG. 5 illustrates a system for distributing fair credit screened market data, according to a second implementation of the invention.

FIG. 5 illustrates a system 500 for distributing credit screened market data, according to a second implementation of the invention. System 500 may distribute data encoded in a manner that is inaccessible (e.g., encrypted) without additional information (e.g., an encryption key used to encrypt/decrypt the data). Although described herein using examples of encryption, other conventional data obfuscation techniques may be used as well. System 500 provides generally similar functionality as system 100 discussed above, but implements communications between system 500 and market participants using private multicast groups.

System Components

System 500 may include a computer system 504, one or more computing devices 510, one or more databases 534, one or more market data screener and distributors 540 a, 540 b, . . . , 540 n, one or more matching engines 570, a credit engine 595, one or more market participant devices 542 a, 542 b, . . . , 542 n, a trading system's electronic communication network (ECN) 544, and/or other components. Each computing device 510 may include one or more processors 512, one or more storage devices 514, and/or other components. Processor(s) 512 may be programmed by one or more computer program instructions, which may be stored in storage device(s) 514. The one or more computer program instructions may include, without limitation, market data distribution application 520.

Market data distribution application 520 may itself include different sets of instructions that each program the processor(s) 512 (and therefore computer system 504). For example, market data distribution application 520 may include a key generator 526, a mapping engine 528, a synchronization engine 530, and/or other instructions 536 that program computer system 504. Matching engines 570, credit engine 595, administration system 590, and market data screener and distributors 540 may each relate to processes executing on computer system 504. As such, market data distribution application 520 may include instructions that cause matching engines 540, credit engine 595, administration system 590, and market data screener and distributors 540 to execute on one or more physical processors. As used herein, for convenience, the various instructions will be described as performing an operation, when, in fact, the various instructions program computer system 504 to perform the operation.

Figure 6:
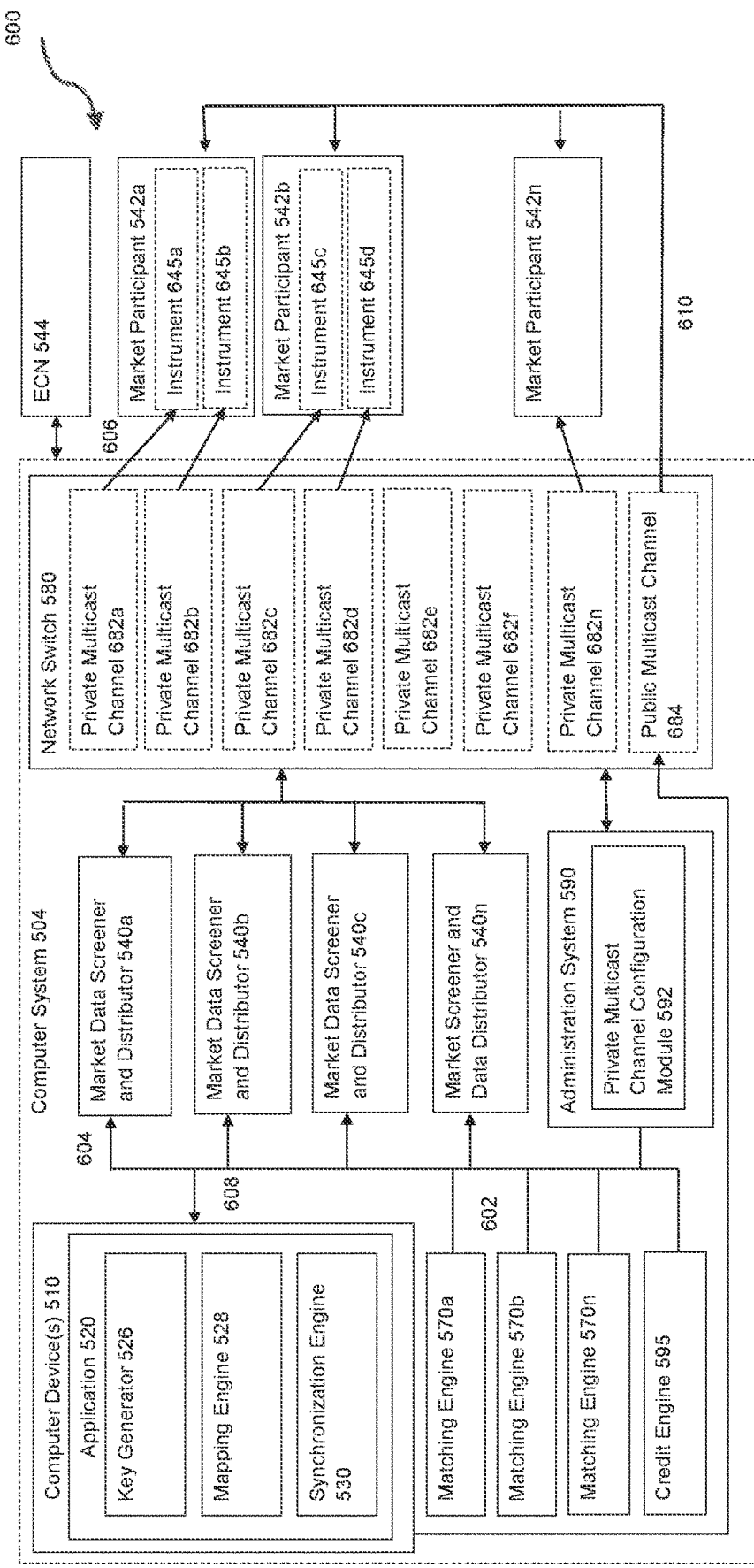
FIG. 6 depicts a flow diagram for components of a system that facilitates distribution of credit screened market data, according to the second implementation of the invention.

FIG. 6 depicts a flow diagram 600 for components of system 500 that facilitate distribution of credit screened market data, according to an implementation of the invention. The various processing operations and/or data flows depicted in FIG. 6 (and in the other figures) are described in greater detail below. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 602, market data distribution application 520 may receive CLOB state information associated with a financial instrument and credit relationship information from matching engines 570 and credit engine 595, from ECN 544, and/or from other information source(s). Matching engines 570 may match buy and sell orders, implement logic for advanced order types such as iceberg orders, store CLOB state information, and provide the CLOB state information to application 520 and/or market data screener and distributors 540. Credit engine 595 provides credit relationship information to application 520 and/or market data screener and distributors 540. The CLOB state information may reflect the prevailing price and quantity information of a given financial instrument at a given point in time. The credit relationship information may reflect credit relationships among different parties at the given point in time.

Creating Private Multicast Channels

In the implementation of FIG. 3 discussed above, a market participant 142 can receive relevant encrypted credit screened market data via a dedicated screener and distributor 140. In the implementation of FIG. 6, however, dedicated (e.g., per-participant) screener and distributors 140 are not utilized. Rather, market participants 542, such as market participant 542a, may receive credit screened market data from one or more market data screener and distributors 540, such as market data screener and distributors 540a-540n, over one or more private multicast channels 682, such as private multicast channels 682a-682n in FIG. 6. The private multicast channels may be configured in the following manner.

In one implementation, to support private multicast channels, particular multicast addresses may be allocated to particular egress ports/IP addresses of network switch 580, such as by using an access control list (ACL) stored in the nonvolatile memory of network switch 580. For example, in a 100 port switch, five private multicast addresses may be pre-allocated per port in a systematic manner such that the multicast address when converted to an integer is 0 modulo 100 for the 0th port, 1 modulo 100 for the 1st port, 2 modulo 100 for the 2nd port and so on. This may be done even where there are less than 100 clients currently connecting to the market data, so as to allow for future market participants to connect without having to make changes to the ACL at network switch 580. Other appropriate implementations may be utilized.

The private multicast channel parameters are also provided to administration system 590 of computer system 504 for use therein and communication to other elements of system 500. In some implementations, where the network switch 580 provides an underlying capability (e.g., a programmable interface) the multicast channel parameters may be automatically transferred from network switch 580 to administration system 590. The multicast channel parameters may also be manually transferred because the multicast addresses are allocated to egress ports/IP addresses in a systematic manner. In the automatic transfer approach, if the network switch 580 provides an API, a computer program on the same network as the network switch 580 and administration system 590 may be written to transfer data between the network switch 580 and administration system 590 to ensure any updates to either are also transferred to the other, thus keeping both consistent. In a manual transfer approach, a human being may login to the management interface of the network switch 580 and update its multicast channel parameters to keep them consistent with changes made to the same at the administration system 590, and vice versa.

Once administration system 590 has received the allocation of multicast addresses and egress ports/IP addresses, computer system 504 may assign, via private multicast channel configuration module 592, particular market participants to particular egress ports/IP addresses at the network switch 580, thereby creating particular multicast channels 682. This allocation can be responsive to a market participant making a particular request for private multicast channel for one or more transactions (e.g., an administrator of system 504 may assign free/unused ports to participants 542 via a web interface into administrative system), responsive to a market participant requesting more general access to computer system 504, such as by setting up an account via a web interface, or any other appropriate manner. The allocation of multicast addresses and egress ports/IP addresses may be manually controlled by the administrator of system 504 or automated as appropriate In the implementation of FIG. 6, private multicast channels 682*a* and 682*b* have been assigned to market participant 542*a*. Unallocated private multicast channels, such as private multicast channels 682*e* and 682*f* in FIG. 6, may be retained for future allocation to additional market participants.

In an alternative implementation, the use of ACL-based access (e.g., network-level security) is not necessary where access is controlled by the use of "half-keys" (e.g., application-level security). For example, private multicast channel configuration module 592 may create or obtain (e.g., from key generator 526) one fixed "half-key" for each private multicast channel. Once a private multicast channel 682 is allocated to a market participant 542, the market participant 542 is provided the half-key for that private multicast channel 682. Computer system 504 may then use the fixed half-key and a public, variable, half-key to secure each multicast channel. In this implementation, although market participants are able to receive credit screened market data updates from all private multicast channels 682, particular market participants 542 can only access credit screened market data updates sent via the private multicast channels 682 for which the market participant 542 has been granted access by virtue of the market participant 542 having both its fixed private half key and the public (varying) half key broadcast to each market participant 542 via multicast. Access to a particular private multicast channel in this implementation does not mean the credit screened market data updates broadcast via the channel is immediately accessible to the market participant 542. Rather, the market participant 542 still must wait for receipt of the encryption key related to the particular credit screened market data update in the manner discussed below to read and utilize the update.

Once particular market participants have been granted access to particular multicast channels, such as by the above processes, market participants may further specify what market data they wish to receive via their assigned multicast channels. For example, a market participant may relate particular instruments and credit codes to particular private multicast channels such that market data related to those instruments and credit codes are supplied to the market participant over the multicast channels. In the implementation of FIG. 6, market participant has specified that it wishes to receive information related to instrument 645*a* via private multicast channel 682*a* and information related to instrument 645*b* via private multicast channel 682*b*. These specifications may be stored in administration system 590, such as in private multicast configuration module 592, for use by administration system 590 and provision to other elements of system 500. In one implementation, a market participant may utilize a web interface into administration system 590 to create, edit, delete, store, and otherwise manage the above relationships. In another implementation, the relationships might be more dynamically identified, where administrative system 590 dynamically associates instruments and credit codes with a market participant's allocated private multicast channels 682 in response to the market participant's request for a market data subscription related to the instrument or credit code. The administrative system 590 then may determine the association between private multicast channels 682 and instruments (e.g., instruments 645) and credit codes in the most efficient manner based on processing loads, latency, and/or data size of the relevant market data update.

In another example, a market participant with multiple credit codes (e.g., one for each trading group at the market participant, or one for each legal settlement entity at the market participant) may choose to partition its credit screened prices across those groups. For instance, 'group 1' could contain all instruments for their 'credit code 1', 'group 2' could contain all instruments for their 'credit code 2' and so on. Other forms of information division, including divisions of instruments that might be duplicative (so the same instrument and same credit code appears on a plurality of groups) may also be specified as needed for particular market participants. In short, the system may allow a participant to assign their instruments and credit codes to their private multicast groups in whatever manner they see fit.

In some implementations, after a market participant has associated particular instruments and/or credit codes with particular private multicast channels, the market participant will then indicate it is ready to receive information by sending a message to network switch 580 (and/or other components of system 504 as necessary, such as administration system 590 or application 520) that it wishes to join or subscribe to each of the private multicast channels from which it wishes to receive market data. This process may be performed manually by the market participant via a web interface, or may be automatically performed in response to the market participant associating particular instruments and/or credit codes with particular private multicast channels. In other implementations, this readiness indication is unnecessary and the market participant 542 is simply statically connected to associated private multicast channels 682 in response to the allocation of instruments and credit codes to the multicast channels 682 in the manner discussed above. The ACL at network switch 580 will, per its standard functionality, and in the manner discussed above, ensure that a particular market participant can only subscribe to private multicast channels that the market participant has been allocated in the manner discussed above.

As described in general above and more specifically below, the market data distributed from market data screener and distributors 540 via private multicast channels 682 is encrypted such that market participants 542 cannot immediately access it. In order to access the information, encryption keys are later distributed by computer system 504. To be able to receive the encryption keys, market participants will also join or subscribe to a public multicast channel 684, either as a separate request by the market participant or separate action by an administrator of system 504, or automatically as part of any of the private multicast channel associations or allocations discussed above. In an implementation, the public multicast group is public insofar as all market participant 542 have access to it. In the manner(s) discussed herein, the encryption key(s) will only be sent after, at any given market data update (or any given quantum as discussed below), all the encrypted market data has been sent on all the private multicast channels.

Based on the above specifications, the market data screener and distributors 540 are made aware by the administration system 590 of which market participants 542 are associated with which private multicast channels 682 and, in turn, which instruments 645 and/or credit codes each market participant 542 has assigned to which of its private multicast channels. With this information each market data screener and distributors 540 is able to perform credit screening and book-snapshotting for the instruments it hosts in a manner consistent with the allocations of private multicast channels 682 to market participants 542, and instruments 645 to those channels 682.

As discussed above, the implementation of FIG. 6 differs from that of FIG. 2 at least because market data screener and distributors 540 are not necessarily divided on a market-participant-by-market-participant basis. Rather, in the implementation of FIG. 6, the market data screener and distributors 540 divide processing tasks on an instrument-by-instrument basis to improve performance of computer system 504. In various implementations, the instruments may be divided alphabetically by name, by volume of expected updates on the instruments to ensure screeners are evenly balanced by message load, by nature of the instrument (e.g., whether it is a major instrument or minor one) or another appropriate manner to improve, for example, efficiency or processing speed. The divisions may be managed by an administrator of system 504 or performed in an automatic manner. By dividing instruments among multiple market data screener and distributors 540, the processing of related market data updates can be parallelized advantageously leading to more efficient and timely processing and to guarantee that all market data updates for a given instrument are taken from the same snapshot of the book. The market data updates can then be provided to market data participants over private multicast channels 682 in the manner discussed above rather than via a direct connection such as in the FIG. 2 implementation (e.g., a UDP or TCP/IP connection).

The use of private multicast channels 682 in this implementation provides many technical improvements and systemic benefits. First, the manner in which market participants 542 receive encrypted market data updates (e.g., private multicast) is the same as the manner it receives encryption keys to decrypt the received market data (e.g., public multicast). This allows the reuse of multicast components on the market participant 542 side.

Second, the use of private multicast channels 682 avoids the need to pass the market participant 542's IP address and port to a market data screener and distributor 540. Passing such information to a market data screener and distributor 540 can be a violation of network security policies requiring firewalls (at additional cost and higher network latency) to mitigate risks associated with bi-directional data flow. It also avoids additional, more dynamic validation that may have to be performed by the market data screener and distributor 540 if market participants 542 cannot guarantee subscriptions are always sent to the same IP address and port.

Third, and with particular reference to TCP/IP connections, private multicast channels 682 provide better guarantees around the timing of market data updates by market data screener and distributor 540. TCP/IP can be tuned to run either for high-throughput or for low latency, but typically not both because the sending application does not have exclusive control over when network packets are actually sent—that is controlled by settings in the network stack at the sender (e.g., whether 'TCP No Delay' is enabled or disabled), and by dynamic behavior of the receiver relating to 'acks' and their 'advertised window'. These and other issues exist with TCP/IP and are further described in Nowlan, M. F., 2014. "A Wire-compatible TCP Implementation for Low-latency Applications" (Doctoral dissertation, Yale University) incorporated by reference here in its entirety.

Finally, by sending the encrypted credit screened market data via private multicast channels 682, efficiency is improved when a participant requires several hosts to receive the same data. Under unicast (UDP or TCP/IP) the same data must be sent duplicatively by the sending application to each and every interested host, whereas under multicast the application sends it once and it is the network devices (e.g., switches) that duplicate it as needed to interested hosts. This improves latency and throughput by reducing the amount of data being sent, meaning the encryption key can be sent more quickly.

Generating and Encrypting Credit Screened Market Data

Credit screened market data updates may be sent to market participants 542 via private multicast channels 682 in various manners. In some implementations, credit screened market data updates may be sent to market participants 542 in parallel based on triggering events determined by one or more components of computer system 504, such as application 520. Such triggering events may be non-periodic (e.g., based on data volume, network load, or other measurable parameter) or periodic, and automatic or manual (e.g., via administrator action in system 504). In one implementation, matching engines 570 continuously transmit (e.g., at a first frequency) messages (represented in FIG. 7 as a bent arrow labeled as mc) that include market update information, which is updated in real-time as orders are received, to market screener and distributors 540. Matching engines 570 may also periodically transmit (e.g., at a second frequency less than the first frequency) multicast messages (represented in FIG. 7 as "quantum" messages mq1 . . . n) to market data distributors 540. The frequency may be every 100 milliseconds or other frequency predefined by an operator of system 504. Each quantum message (mq) may be in addition to the continuous, streaming market data information matching engines 570 transmit to the market data screener and distributors 540. In response to receipt of a quantum message (mq), each market data screener and distributor 540 may process its copy of the market data update information available to it at the time for each instrument associated with that market data screener and distributor 540 (in the manner discussed above), and transmits a credit screened market data update (U1 . . . n) to market participants 542 via private multicast channels 682 in the manner discussed above. In this manner, in the time between quantum messages (mq), credit screened market data updates are not transmitted to market participants 542. It should be noted that the market participants 542 may continue to send orders into the ETV 110 and those orders may modify the states of the CLOB (i.e., the market data update information). Further discussion of quantum calculation may be found in U.S. Pat. No. 11,282,138, titled "Informational Incentives for Submitting Maker Orders" and incorporated herein in its entirety.

In one implementation, as discussed above, key generator 526 may generate an encryption key used to encrypt the credit screened market data sent via private multicast channels 682 to market participants 542. For example, key generator 526 may generate an encryption key used to encrypt data each time that CLOB state information for a given financial instrument is received. Key generator 526 may also generate an encryption key for any triggering event discussed above, such as for each quantum. An encryption key may generally refer to a piece of information (e.g., a random number, a hash, a parameter, etc.) that determines the functional output of a process used to encrypt data.

For example, in an operation 604, market data distribution application 120 (in conjunction with matching and/or credit engines 570, 595) may provide each screener 540 with the encryption key, the CLOB state information, and credit relationship information for the particular instrument(s) associated with the screener 540 related to particular market participants 542 (or, in some implementations, all instrument and credit relationship information from which the screener 540 may select relevant parts). Alternatively, market data distribution application 120 may provide each screener 540 with the encryption key upon receipt of quantum indication as discussed above. Screeners 540 may then parse the credit relationship information relevant to market participants 542 and determine the trades market participants 542 may execute for a particular financial instrument relevant to that screener 540. For example, the credit screened market data for market participant 542a related to a particular instrument may include a top of book bid/offer for a spot FX instrument (formatted as quantity@price) of 5M@1.0001/3M@1.0002 on a given instrument at a given point in time, whereas, for the same point in time and the same instrument, the credit screened market data for market participant 542b may include a bid/offer of 3M@1.0001/1M@1.0003.

Each screener 540 may encrypt each credit screened market data update using the encryption key generated and received in any of the manners discussed above prior to transmission via a private multicast channel 682 to market participant(s) 542. Such encryption may use the Advanced Encryption Standard (AES), or may be an XOR cipher used as a One Time Pad (OTP), or some other encryption standard or technique. All screeners may use the same encryption key (received from key generator 526) for encrypting credit screened market data. Of course, this encryption key will be replaced by a new encryption key when new CLOB state information is received.

Generating and Encrypting Credit Screened Market Data Using TEA/CTR

While XOR OTP encryption is unbreakable, in other implementations computer system 504 may utilize an encryption scheme based on Needham and Wheeler's Tiny Encryption Algorithm (TEA) in Counter 'CTR' Mode. The use of such an encryption scheme provides improved efficiency (e.g., reduced bandwidth and decreased latency from when the data is sent to when the complete key is received), In such an implementation, at each market update (or each quantum), each market data distributor will generate a random key (the key for TEA) in the manner discussed below, and a series of random nonces (the nonces are required for CTR mode). Unlike in a traditional CTR implementation however, computer system 504 reuses nonces across multiple market participants 542 for a given market data update (or each quantum). This reuse increases the speed of the encryption operation at each market data update (or each quantum). By reducing the time taken to perform encryption the system may (1) send market data updates more quickly, (2) reduce the delay between when the encrypted market data update is sent and the encryption key is sent for decryption, (3) provide efficiencies in subsequent analysis of sent data (e.g., where sent data is captured by the venue operator and subsequently analyzed for various purposes) with less computation, and (4) require fewer market data screener and distributors 540 to achieve necessary performance.

More specifically, as described above, market data screener and distributors 540 operate in parallel on an instrument-by-instrument basis, and therefore have access to (1) all the credit codes associated with all market participants 542, and (2) all the instruments that it services. Thus, instead of creating a unique nonce for each credit-code and instrument pair, each market data screener and distributor 540 may reuse nonces across credit codes at any given market data update. In such an implementation, for a given market data update, where there are M market participants 542 each with a maximum of N credit codes, than the number of nonces required is only N times the number of instruments with updates I. In contrast, under a naïve or 'standard' scheme, the number of generated nonces would instead be in the order of M*N*I. Reducing the number of generated nonces from M*N*I to N*I results in important performance improvements because utilizing encryption functions is a relatively intensive function that reduces overall system performance.

In other words, for a given market data update, each market data screener and distributor 540 in system 504 creates a first nonce for all market participant 542s' first credit code on a first instrument, a second nonce for all market participant 542s' second credit code on that first instrument, and so on until no market participant 542 has any more credit codes for that instrument. In this manner, the number of nonces created is thus equal to the maximum number of credit codes any market participant 542 possesses. The process then continues for the second instrument and so on. Based on TEA/CTR encryption, a series of bitstrings are computed, one per nonce. Per TEA/CTR, these bit strings are then XOR'd with the market data updates before they are sent to market participants 542 via private multicast channels 682. In this manner, each bit string is created only once, but reused many times for XOR'ing.

An example of pseudocode using TEA/CTR encryption for bitstring and nonce reuse according to the above implementation follows:

```
1   Let M be the max number of credit codes any participant can have
2   Let C be the client-facing key used to perform encryption at this
    quantum
3   for each instrument I with market data updates at this quantum {
4       for k = 1 to M {
5           Generate a new random nonce N
6           Use N and C to generate bitstring B of length L blocks per the
            encryption function
7           for each participant P subscribed to I {
8               if the k^{th} credit code R for P exists {
9                   Encrypt the market data update for the 3-tuple of (I, P, R)
                    by XOR'ing it with B
10              }
11          }
12      }
13  }
```

Figure 8:
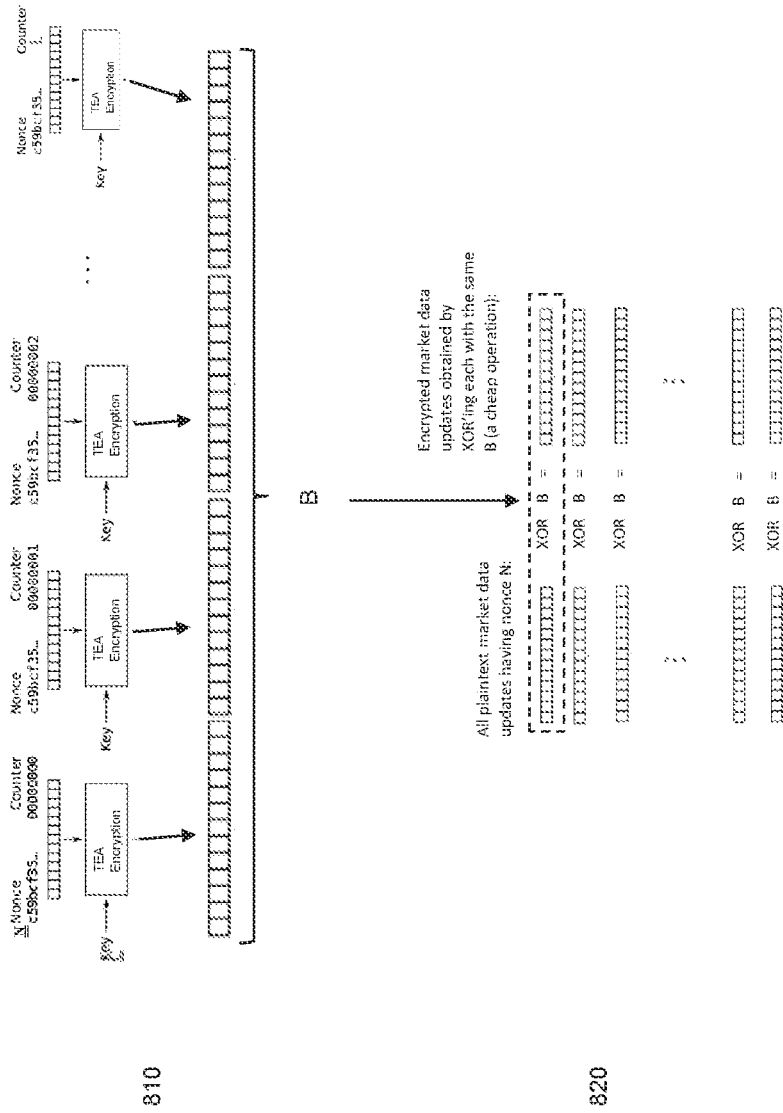
FIG. 8 depicts a process flow diagram for encryption key generation according to an implementation of the invention.

An implementation of this process is also depicted in FIG. 8. Operation 810 in FIG. 810 corresponds to lines 1-6 of the pseudocode, where the long bitstring B is the output from the TEA encryption function discussed above which, in CTR mode, takes as inputs: the key, a block counter and nonce. Calculation of B is relatively expensive, so it is ideal to calculate it as few times as possible. In operation 820, after B is computed, it can be reused over-and-over again to encrypt many different market data updates at a quantum (as explained above). Operation 820 includes, per CTR mode, XOR'ing B with the plaintext of the market data update sharing the same nonce as B.

As discussed elsewhere herein, after all relevant market data updates have been encrypted in any of the manner(s) above and have been sent via private multicast channels 682, a single encryption key for the update is sent to market participants 542 via a 'public' multicast channel, such as public multicast channel 684. A plaintext identifier that relates the encryption key to the encrypted market data updates is sent with both the key and the encrypted credit screened market data. The nonce described above may also be sent in plaintext with the encrypted payload (in the same message).

Encryption Key Generation

In some implementations, key generation may be undertaken by market data screener and distributors 540. In such implementations, all of the market data screener and distributors 540 being used to provide market data updates are sent the same two, independent (truly) random numbers (e.g., numbers that may have been generated by hardware, as opposed to a pseudorandom number generator (PRNG)). These numbers will form the 'seed' for custom pseudorandom number generation which will, in a deterministic manner, provide a single key used by each relevant market data screener and distributor 540 at the time of each market data update (or quantum) for use in the implementation(s) discussed herein. Using a single key at each market data update (or quantum) across relevant market data screener and distributors 540 (1) makes decrypting market data updates easier for market participants 542 (e.g., it can be done with fewer lines of code as compared to using distinct keys per screener 540) and (2) reduces the network traffic both sent from the system 504 and received by market participants 542, thus improving systemic efficiency.

Calculating a key in the above manner provides additional security as compared to standard PRNG at each market update (or quantum) because if a market participant 542 were to learn which PRNG were being used, that market participant 542 could independently generate the keys before they were used for encryption and sent to the market participants 542 via private multicast channels 682. This would, of course, defeat the purpose of encrypting the market data updates in the first place, which is to ensure market participants 542 can only observe their credit screened market data updates at substantially the same time.

Figure 9:
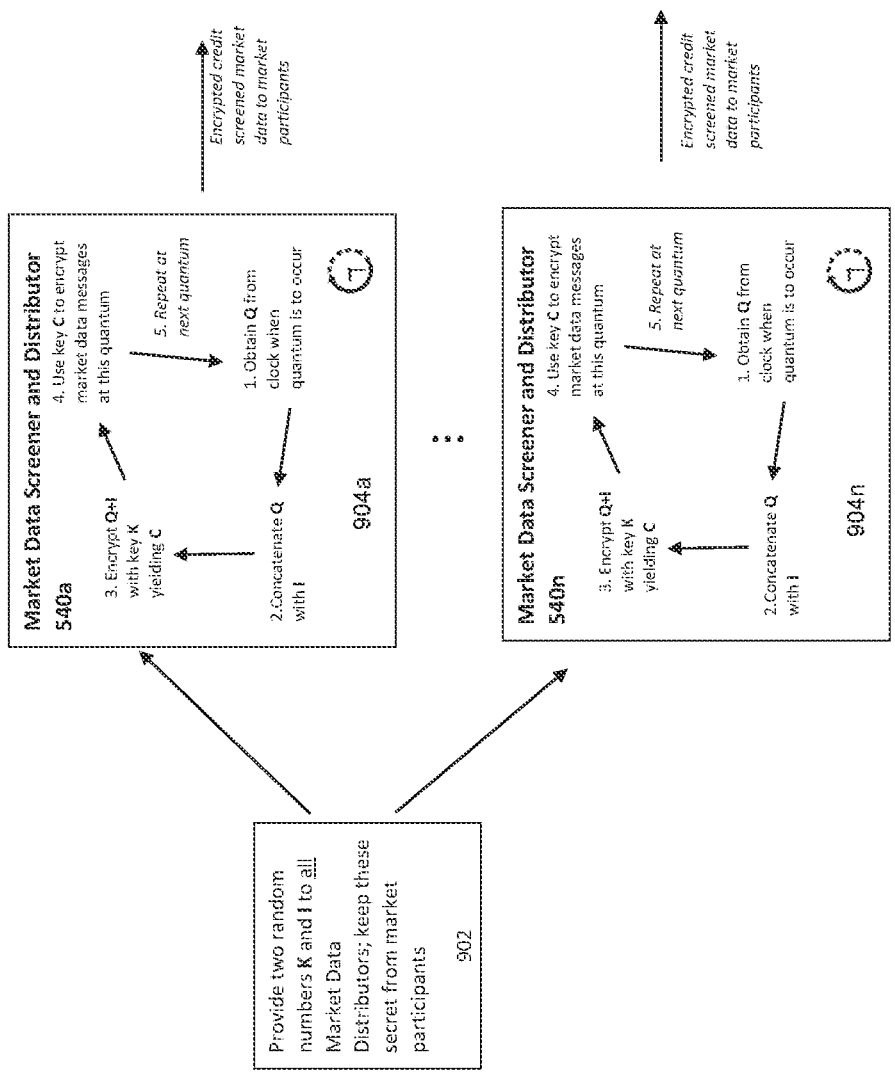
FIG. 9 depicts a process flow diagram for encryption key generation according to an implementation of the invention

In a specific implementation shown in FIG. 9, each market data update (or quantum) has a unique identifier that can be computed from the timestamp at which it is specified to be sent. For instance, the market data update (or quantum) identifier might be the least significant 32 bits Q of the number of milliseconds that have elapsed since the Unix Epoch, or number of milliseconds that have elapsed since the start of the trading week, or some granular unit of time that has elapsed since some other fixed point in time, or a hash of any of these time-based values. In this implementation, a first random number provided to all market data screener and distributors 540 at operation 902 may be a 32 bit integer I, and the second a 128 bit integer K. The client-facing encryption and decryption key C for a market data update is then computed by using TEA to encrypt the 64 bit block obtained by concatenating the 32 bit quantum id Q and the initial 32 bit integer I with the 128 bit integer as key K, as shown in operations 904a and 904n in FIG. 9.

In some implementations, rather than being provided only at the start of the week, the K and I numbers can be refreshed as needed, such as throughout the trading week. For example, the 32 bit Q integer could 'wrap' or repeat which may detrimentally cause the sequence of client-facing encryption keys to repeat. This may be prevented by resending a new K and I (seed values) to all market data screener and distributor 540 along with an identifier for the market data update at which they are to become active.

Additionally, other encryption algorithms than TEA may be used. Any scheme that allows each market data screener and distributor 540 to independently compute the same difficult-to-guess client-facing key at the same market data update using initial 'seed' values may be used. Regardless of the encryption algorithm used, the K and I (i.e., 'seed') values should be kept secret from market participants 542 while they are in active use.

Transmitting the Encrypted Credit Screened Market Data

In an operation 606 in the implementation depicted in FIG. 6, as discussed above, each market data screener and distributor 540 may transmit its encrypted credit screened market data via private multicast channels 682 to market participants 542 according to the parameters for the private multicast channels maintained by the administration system 590 and/or private multicast channel configuration module 592 and in response to any triggering event discussed above or other appropriate timing. As discussed above, this transmission scheme provides various improvements over point-to-point transmission schemes, such as TCP/IP. In any event, due to the nature of internet communications, a given market participant 542 may receive its credit screened market data before another market participant 542. However, because each credit screened market data update is encrypted prior to transmission using one or more of the encryption implementations discussed above, the given market participant 542 may not decrypt the encrypted credit screened market data without the encryption key.

Reducing Peak Bandwidth During Transmission

In an implementation, one or more screeners 540 may, individually or collectively, delay transmission of encrypted credit screened market data. For example, one or more screeners 540 may store the credit screened market data in a memory and transmit the credit screened market data periodically (e.g., every 50 milliseconds) between market updates. Doing so may advantageously reduce the amount of peak network traffic that typically occurs after a market update (e.g., after new CLOB state information is published by the venue), which may also result in fewer network errors such as dropped data packets. Thus, the system may leverage the encryption of credit screened market data and delay the transmission of encryption keys described herein to reduce peak network bandwidth usage as well.

Transmitting Encryption Keys

In an operation 608, market update distribution application 520 may obtain an indication that a particular encrypted credit screened market data update relating to a particular financial instrument has been transmitted to each market participant 542 and, responsive to the indication, cause the encryption key used to encrypt the credit screened market data to be provided to each market participant 542.

Synchronizing the Provision of Encryption Keys

In an implementation, because the volume of market updates may be (and typically is) high, synchronization engine 530 may monitor the activity of market data screener and distributors 540, which may operate in parallel with one another as described in the above implementations. Synchronization engine 530 may receive the key generated according to any of the above implementations, along with an indication that a related market data update has been transmitted to each market participant 542.

Synchronization engine 530 may synchronize provision of the encryption key to market participants at operation 610 based on whether each of the market data screener and distributors 540 has provided relevant market updates to each relevant market participant 542. In other words, synchronization engine 530 may provide the encryption key to market participants 542 only when it is determined that all of the market participants 542 that should have been provided with market updates, such as in response to a quantum message, have had market updates transmitted to them).

Synchronization engine 530 may determine whether the encrypted credit screened market data was provided to market participants 542 in various ways. For example, synchronization engine 530 may obtain an indication from each relevant market data screener and distributor 540 that it has distributed encrypted credit screened market data relevant market participants 542. Alternatively or additionally, synchronization engine 530 may obtain an indication from a downstream listener, such as a passive or active network listener (not illustrated in FIG. 6), that it has detected relevant market data screener and distributors 540 have provided encrypted credit screened market data to the relevant market participants 542. Identification of relevant market data screener and distributors 540 and market participants 542 for a particular market data update may be provided from administration system 590. In whichever manner or combination of manners the indication is received, synchronization engine 530 may ensure that all market recipients 542 have received their respective encrypted credit screened market data before simultaneously providing an encryption key used to decrypt the encrypted market updates. In some implementations, this is done on a quantum-by-quantum basis.

In an implementation, responsive to the indication that relevant encrypted credit screened market data has been sent to all relevant market recipients 542 for a particular market data update or quantum, market update distribution application 520 may transmit the encryption key to each relevant market participant 542, cause each market data screener and distributors 540 to transmit the appropriate encryption key to each market participant 542, or otherwise make the encryption key available to each market participant 542.

Figure 10:
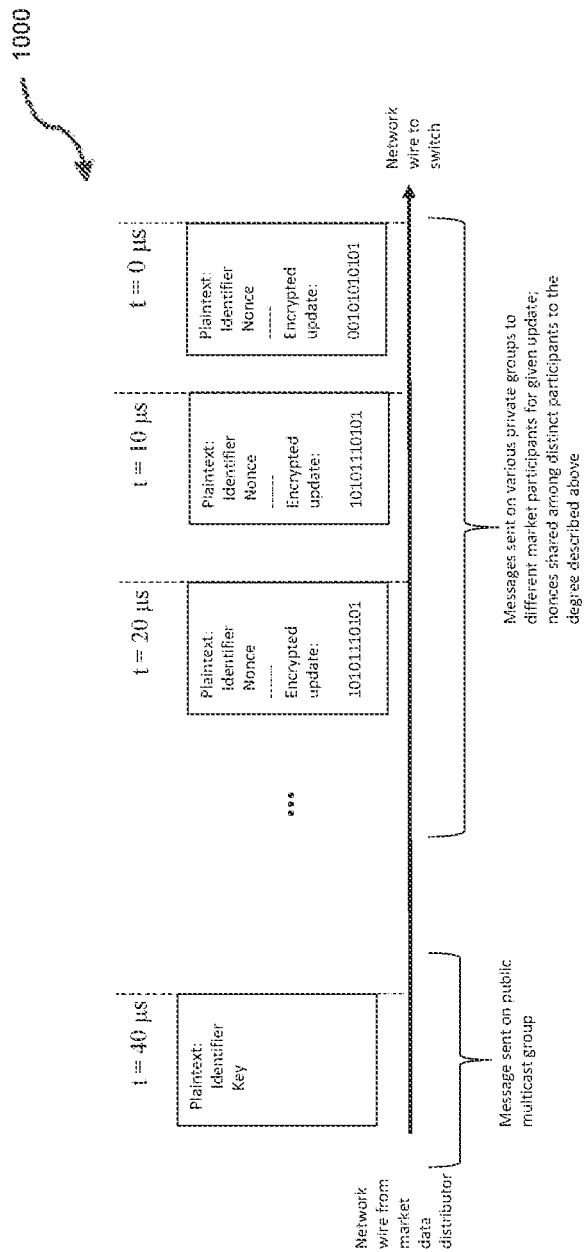
FIG. 10 depicts a data flow diagram for distributing fair credit screened market data, according to an implementation of the invention.

In the exemplary data flow 1000 depicted in FIG. 10, encrypted credit screened market data may be transmitted to market participants 542 ("μs" being microseconds). At t=0 μs, a first message including encrypted credit screened market data for a first market participant 542a is sent, at time t=10 μs, a second message including encrypted credit screened market data for a second market participant 542b is sent. At t=20 μs, a third message including encrypted credit screened market data for a third market participant 542n is sent. Because the credit screened market data is encrypted, market participants 542a, 542b, and 542n are unable to decipher or understand the credit screened market data upon receipt. At t=40 μs, after an indication that the three previous messages have been sent, an encryption key is sent by system 500 to each of the market participants via one of the above implementations, which they may in turn utilize to decrypt and use the credit screened market data. In this manner, even where market participants 542a, 542b, and 542n receive the encrypted credit screened market data at different times, they are able to decipher or understand the credit screened market data at the same time after reception of the encryption key.

Figure 11:
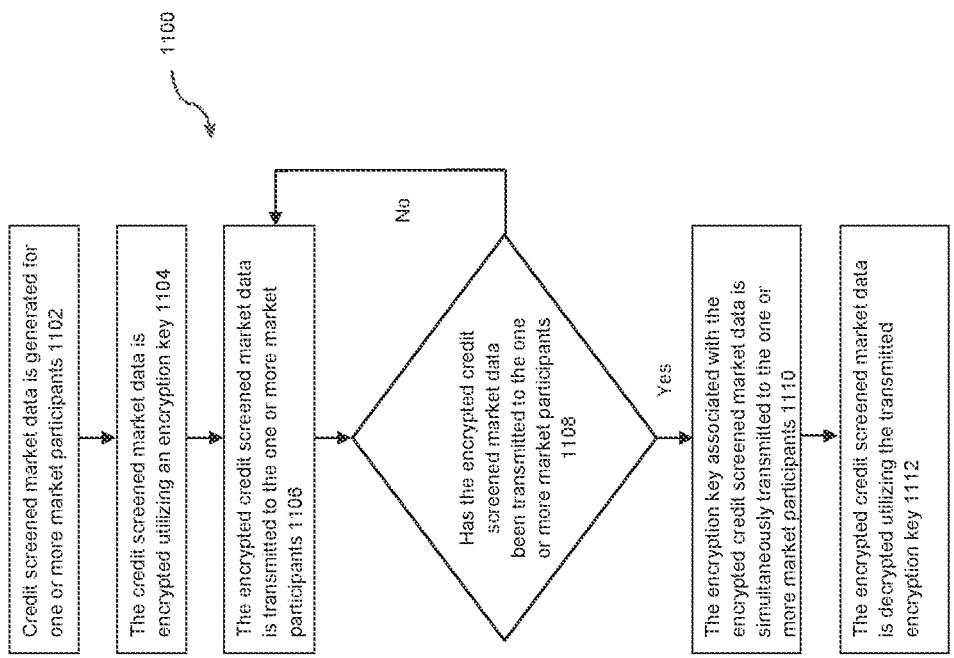
FIG. 11 depicts a process diagram for distributing fair credit screened market data, according to an implementation of the invention.

FIG. 11 depicts a process flow diagram 1100 for a process of distributing credit screened market data, according to an implementation of the invention. The various processing operations and/or data flows depicted in FIG. 11 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Figure 7:
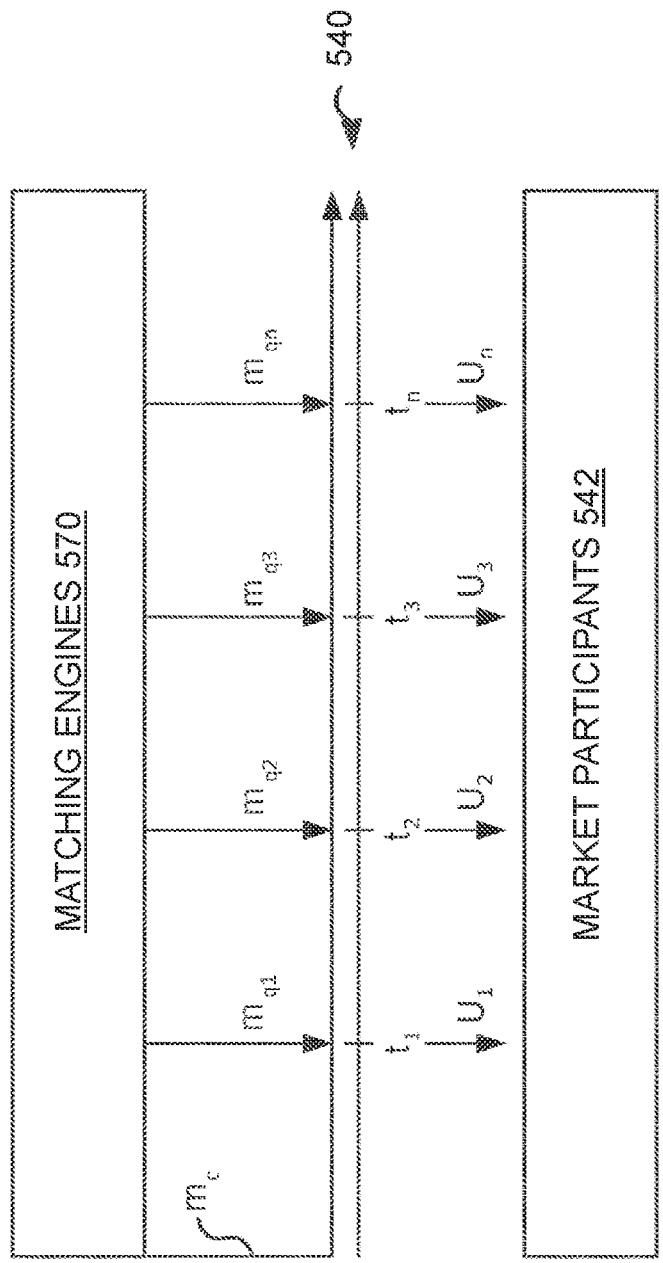
FIG. 7 depicts a timeline of generation of credit screened market data updates according to quantum messages according to an implementation of the invention.

In an operation 1102, credit screened market data is generated for one or more market participants on an instrument-by-instrument basis as discussed above with regard to the FIG. 6 and/or FIG. 7 implementation. In one implementation, credit screened prices and quantities associated with a financial instrument may be received for one or more market participants from an electronic trading system, such as a FX ECN and generate credit screened market data indicative thereof.

In an operation 1104, the credit screened market data is encrypted utilizing an encryption key utilizing any of the encryption methodologies discussed above.

In an operation 1106, the encrypted credit screened market data is transmitted to the one or more market participants via private multicast channels as discussed above with regard to the FIG. 6 and/or FIG. 7 implementations. Because the credit screened market data is encrypted, market participants are unable to decipher or understand the credit screened market data upon being received.

In an operation 1108, it is determined whether the encrypted credit screened market data has been transmitted to the one or more market participants. If transmission is confirmed, the encryption key associated with the encrypted credit screened market data (or the relevant quantum) is simultaneously transmitted to the one or more market participants at operation 1110. For instance, after the market participants have been sent the encrypted credit screened market data for a given market data update via private multicast channels, the encryption key which was utilized to encrypt the credit screened market data, is transmitted to the market participants utilizing a public multicast channel. In one implementation, a multicast transport protocol may be utilized to transmit (network-characteristics being equal) the market participants the encryption key at the same time via the public multicast channel. Upon receipt of the encryption key, the market participants may decrypt and decipher the credit screened market data including each market participant's credit screened prices and quantities.

If transmission of the encrypted credit screened market data to one of the one or more market participants cannot be confirmed, the encrypted credit screened market data is re-transmitted to the one or more market participants after a predetermined time period at operation 1106.

In operation 1112, the encrypted credit screened market data is decrypted by the market participants utilizing the transmitted encryption key.

Confirming Transmission of Credit Screened Market Data Updates

Figure 12:
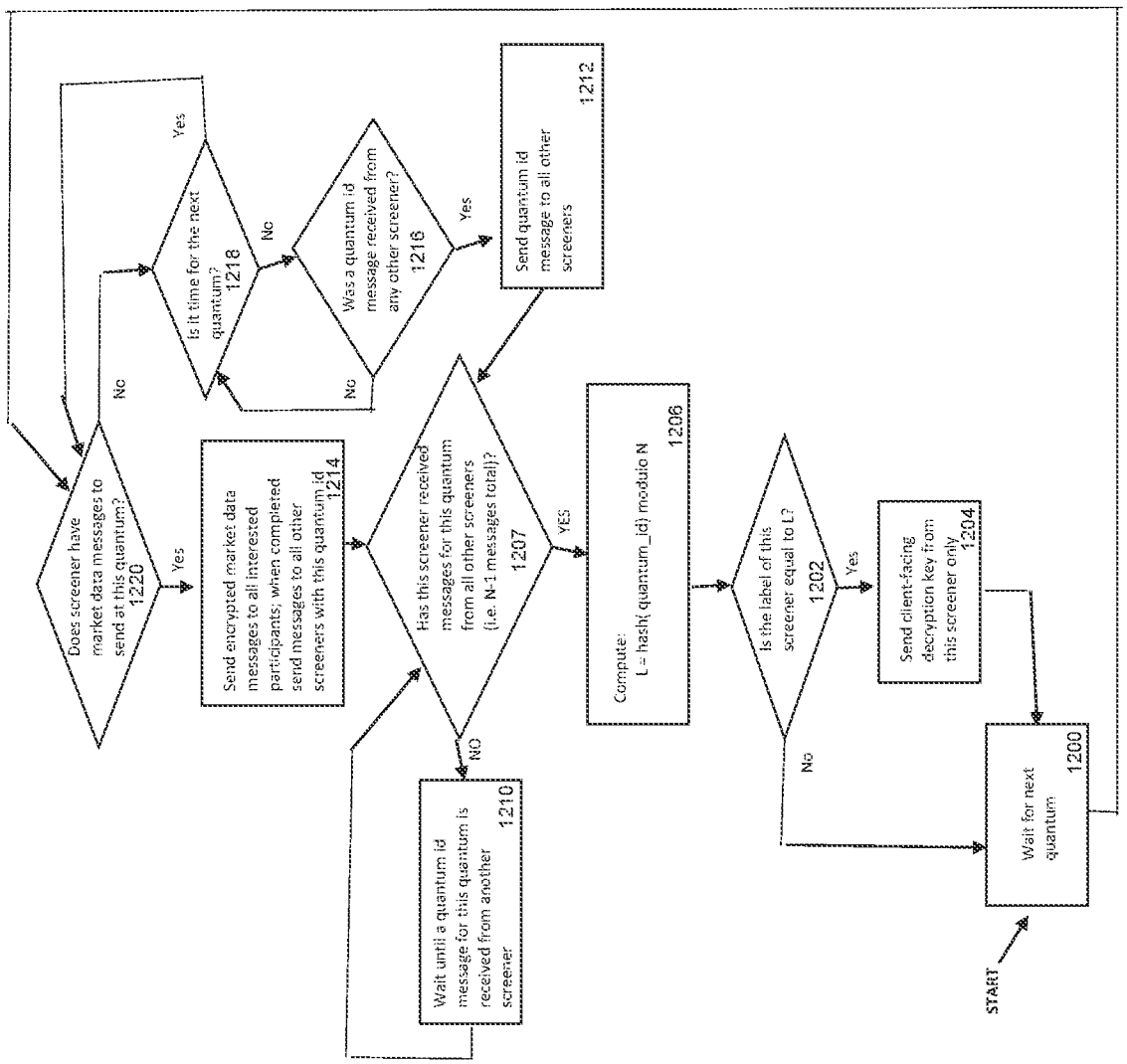
FIG. 12 depicts a process diagram for distributing encryption keys from a particular screener according to an implementation of the invention.

In another implementation shown in FIG. 12, a single key for each market data update (or quantum) may be utilized to conserve network bandwidth and improve efficiency. For example, in the implementation shown in FIG. 9, an encryption key may be generated and distributed from each market data screener and distributor 540 for each market data update. In implementations where the market data screener and distributors 540 are also responsible for distributing the encryption key to the market participants 542 so that the market participants 542 may decrypt the encrypted credit screened market data updates, for the purposes of fault tolerance and to reduce implementation complexity at system 500, it is also desirable to ensure that no specific market data screener and distributor 540 is 'the leader', i.e., solely responsible for sending the decryption key to market participants at each market data update. Finally, and again for the purposes of efficiency, it is desirable that the encryption key is only sent out at a given market data update (or quantum) when there are market data updates at that update time (some market data updates actually have no such updates because the books for all instruments on the venue have not changed since the previous update).

Such desirable characteristics may be provided according to the following implementation. As shown in FIG. 6, each of the market data screener and distributors 540 are connected to one another, such as by way of a single TCP/IP connection between each, or shared reliable message bus. If, at a given market data update (or quantum), a market data screener and distributor 540 has credit screened market data update messages to send to a market participant 542 (e.g., because some of the books for the instruments hosted by that the market data screener and distributors 540 have changed) then it encrypts those updates using the key for that market update per any of the implementations above and sends them to the interested market participants 542 according to any of the implementations above. Having sent encrypted market data updates to relevant market participants 542, the market data screener and distributor 540 notifies the other market data screener and distributors 540 that it has completed sending its encrypted credit screened market data for that market data update (or quantum). Upon receipt of such a message, each of the other market data screener and distributors 540 either reply to all market data screener and distributors 540 that it has no credit screened market data updates to send to market participants (e.g., because none of their instrument's books have changed), or that it has completed sending its credit screened market data updates to market participants for that market data update (or quantum). In both cases only an identifier of the market data update (or quantum) needs to be sent between the market data screener and distributors 540. The result of this notification scheme is that the status of each market data screener and distributor 540 as to the sending of credit screened market data related to a particular market update is known to all market data screener and distributors 540. This can increase efficiency where no market data screener and distributors 540 have credit screened market data to send at a particular market data update (or quantum). In such a situation no client-facing key will be distributed for that 'empty' market data update (or quantum).

Further, all market data screener and distributors 540 can also infer the end of a non-empty marker data update by receiving messages from all other market data screener and distributors 540 that they have sent credit screened market data to market participants 542 to confirm transmission of all relevant market data updates, such as for a particular quantum. In such an implementation, each market data screener and distributor 540 must be made aware of the total number of active screeners 540 for system 504. Having received messages from all other market data screener and distributors 540 for that market data update (or quantum), preferably only one such market data screener and distributor 540 should send the relevant encryption key to the market participants 542 for decryption. Without having a predesignated 'leader' market data screener and distributor 540, this can be achieved by first hashing and then performing a modulo operation on the market data update ID (or quantum ID). For instance, if the market data update ID hashes (on all screeners, using the same hash function) to the integer 5293253 and there are a total of five screeners, then each screener would compute 5293253 mod 5=3. This would mean the only the market data screener and distributors 540 labeled "3" would send the client-facing key; the other screeners labeled 0, 1, 2 and 4 would do nothing responsive to determining all data for the market data update had been sent. Of course, to determine which market data screener and distributors 540 sends the key, if there are N such market data screener and distributors 540 then each such screener must be assigned its label, such as on startup, and those labels must be 0, 1, . . . , N−1. Further the modulo operator must take N as its right-hand argument.

An implementation of the above processes is shown in FIG. 12 based on the quantum implementation discussed above. The process begins with a particular market data update for a quantum at operation 1200. Once a quantum is identified, each market data screener and distributor 540 will determine if it has a credit screened market data update to send to market participants 542 at operation 1220. If so for a particular screener, encrypted messages are sent to the market participants and confirmation that the messages were sent is reported to the other screeners at operation 1214. Next, at operation 1207, it is determined whether the screener has received messages from all other screeners that encrypted market data has been sent. If not, at operation 1210, the screener waits until another message is received before passing the process back to operation 1207. If it is determined that messages have been received from all other screeners at operation 1207, L is computed at operation 1206. If the label of the screener is equal to L at operation 1202, the decryption key is sent to the market participants from that screener at operation 1204. If not, the process passes to operation 1200 to begin again. If, at operation 1220, it is determined that the screener does not have market data updates to send at the quantum, the screener will then determine if it is time for the next quantum at operation 1218. If so, the process will return to operation 1220. If not, at process 1216, it is determined whether other screeners have sent a quantum ID message that it has sent encrypted market data. If not, the process returns to operation 1218. If so, at operation 1212, the screener will send a quantum ID message to all other screeners and the process will pass to operation 1207.

Staggering Refreshes

In some implementations, for the purposes of network bandwidth conservation and latency reduction, market data messaging schemes typically send (1) an initial snapshot of the book, and then subsequently only (2) the incremental differences in the book since the initial snapshot (often referred to as 'differences', 'diffs', or 'incremental updates').

These incremental differences specify only what has changed about the book (e.g., delete a price level, modify the quantity at a specific price level, insert a new price level and quantity etc.). Transmitting only an incremental update requires sending less data than retransmitting the entire book (which includes the levels in it, even those that haven't changed) at each market data update (or quantum). But, to utilize this scheme, market participants must maintain a local copy of the book in memory and apply each incremental update upon its receipt to the local copy of the book, thereby updating that local copy of the book.

When market data is delivery is unreliable (as in the multicast protocol, UDP, etc.) a single missed incremental update can corrupt a market participant's local copy of the book. To address this problem, market data messaging schemes may provide a recovery process for missed incremental updates, and/or provide replacement full snapshots (a "recovery snapshot") of the book at regular intervals, even if doing so is duplicative of what was previously sent to participants as an initial copy of the book and subsequent incremental updates.

One drawback of regularly sending entire snapshots in the presence of credit screened market data is that, as a general proposition, different data must be sent to all participants. Thus, sending different entire snapshots to different market participants can dramatically increase bandwidth consumption and latency in market data distribution when compared to sending only incremental updates, or when compared to sending the same market data to all market participants as would happen on a centrally-cleared trading venue. It follows then that there exists a need to send such snapshots in the presence of credit screened data in a manner that is conservative of bandwidth and latency.

In an implementation, the sending of recovery snapshots may be staggered such that all participants are not simultaneously (or even in close temporal proximity) sent their recovery entire snapshots. In the presence of multiple market data screener and distributors, it may be desirable to ensure that each distributor does not have to continuously and explicitly communicate with the others so as to coordinate the sending of such snapshots in a staggered manner. From a participant perspective, it may further be desirable to ensure that such updates are sent at somewhat regular intervals rather than completely randomly.

In an implementation, distinct market data screener and distributors may independently stagger the sending of recovery snapshots to participants by applying a hash function to the pair of the credit code and instrument for the recovery snapshot. In Java, for instance, this may involve concatenating the market participant's credit code and the instrument and calling hashCode( ) on the result e.g., (instrument+ creditCode).hashCode( ). The result of that hash can be converted to a timestamp at which the snapshot should be scheduled to be sent for that instrument and credit code through modulo arithmetic e.g., by hash modulo 60, where the result is the number of seconds past the minute when the snapshot is scheduled to be sent. To the extent the hash function is a good one, the recovery snapshot will be uniformly distributed throughout the whole minute, thus reducing peak bandwidth consumption and latency in distributing them. Of course, other intervals and granularities may be used e.g., hash modulo 120 could be the number of seconds past an even minute when recovery snapshots are instead to be distributed every 120 seconds.

Having described how recovery snapshots may be scheduled such that they are not all sent at once, and such that each market participant receives its recovery snapshots at regular intervals, we now turn to describing how, in an implementation, such a schedule may be incorporated into the market data distribution scheme utilizing conflation quantums.

In some implementations, it may be wasteful of bandwidth to send an encryption key to all participants via multicast if the only encrypted data being sent is recovery snapshots for a handful of instruments to a handful of market participants. In such a situation, a recovery snapshot may be incorporated into a market update (or quantum) where the instrument in question has an actual substantive update (e.g., a change to the instrument's book). This may be achieved by adding a tolerance to the scheduled time at which the recovery update is specified to be sent. For instance, if the recovery snapshot for a participant is scheduled to be sent at 10 seconds past the minute, the tolerance added might be 5 seconds either side of that. So, if the book changes for that instrument any time between 5 and 15 seconds after the minute, then the recovery snapshot will be sent in that market data update for that participant instead of an incremental update, noting the snapshot will incorporating information that would have otherwise been conveyed in the incremental update (other participants without a scheduled recovery snapshot at this quantum will only be sent incremental updates). If there are no updates for the instrument during this interval, but other instruments hosted by the same market data screener and distributor have updates, the snapshot may be sent during one of these quantums using its encryption key. If there are no updates for any instruments at all on any market data screener and distributor during this interval, then additional techniques may be applied to ensure the snapshot is nevertheless ultimately sent, and sent in an efficient manner.

One such additional technique may be to send the recovery snapshot between (and not at) a market data update (or quantums), unencrypted. In this context 'between' may mean at the midpoint-in-time between market data updates (or quantums) so, for instance, if the market data quantums are at 12:00:00.000 µm and 12:00:00.050 pm then the midpoint-in-time would be 12:00:00.025 pm. In this way a key is not otherwise (wastefully) broadcast to all market participants, noting that staggering will mean only a few market participants will actually have received a recovery snapshot. To preserve fairness, if the recovery snapshot is sent in this way, it should convey no new information that wasn't already previously sent to the market participant. Put another way it should allow the participant to restore their local copy of the book exactly only as if they had received all incremental updates prior to that snapshot.

Figure 13:
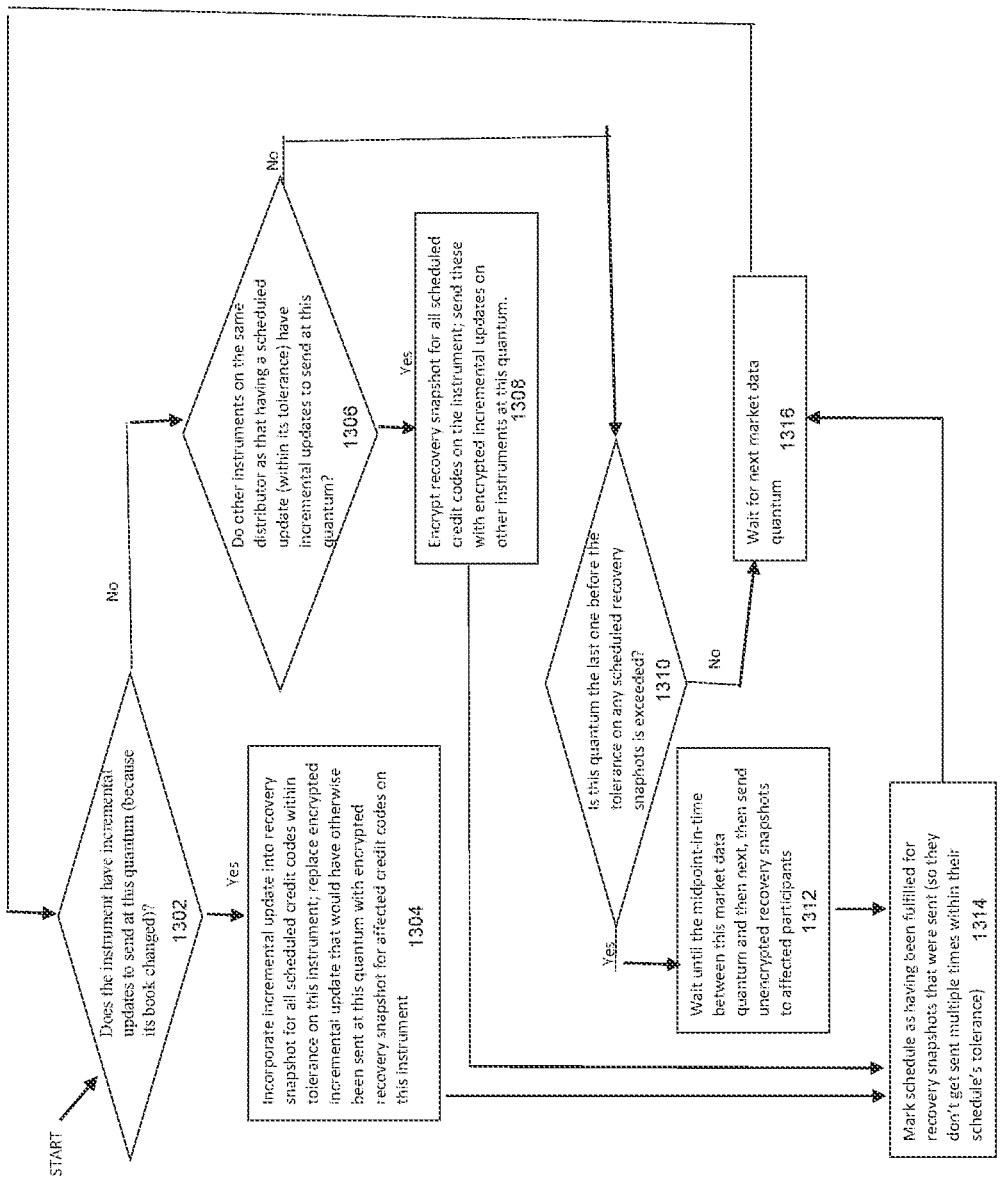
FIG. 13 depicts a process diagram for staggering refreshes according to an implementation of the invention.

The above process is shown in more detail in FIG. 13. FIG. 13's process begins at operation 1302, where it is determined whether any incremental updates are necessary as to a particular instrument on a particular market data screener and distributor at a present quantum (e.g., if its book changed). If so, the incremental update is incorporated into a recovery snapshot for all associated credit codes within a temporal tolerance on this instrument and the update is replaced with the encrypted recovery snapshot at operation 1304. Then, at operation 1314, the schedule for recovery snapshots is updated and the process waits for the next quantum at operation 1316 before repeating. If, at operation 1302, if the instrument has no incremental updates, at operation 1306, it is determined whether any other instruments on the same market data screener and distributor at the present quantum have any incremental updates. If so, at operation 1308, a recovery snapshot is sent for such other instrument(s) at the quantum, and the schedule for recovery updates is updated at operation 1314. If it is determined that no other instruments on the same market data screener and distributor at the present quantum have any incremental updates at operation 1306, it is determined whether the present quantum is the last one before the temporal tolerance as to any scheduled recovery snapshots at operation 1310. If no, the process proceeds to operation 1316 and waits for the next quantum. If yes, an unencrypted recovery snapshot is sent at the midpoint between the present and next quantums at operation 1312.

Examples of System Architectures and Configurations

Different system architectures may be used. For example, all or a portion of market data distribution application 120/520 and/or one or more screeners 140/540 may be executed on a server device. In other words, computing device 110/510 as illustrated may include a server device that obtains a user request from a user device operated by the user. In implementations where all or a portion of market data distribution application 120/520 and/or one or more screeners 140/540 is executed on the server device, the server device perform all or a portion of the functionality of market data distribution application 120/520 and/or one or more screeners 140/540.

Although illustrated in FIGS. 1 and 4 as a single component, computer system 104/504 may include a plurality of individual components (e.g., computer devices) each programmed with at least some of the functions described herein. In this manner, some components of computer system 104/504 may perform some functions while other components may perform other functions, as would be appreciated. The one or more processors 112/512 may each include one or more physical processors that are programmed by computer program instructions. The various instructions described herein are exemplary only. Other configurations and numbers of instructions may be used, so long as the processor(s) 112/512 are programmed to perform the functions described herein.

Furthermore, it should be appreciated that although the various instructions are illustrated in FIGS. 1/5 as being co-located within a single processing unit, in implementations in which processor(s) 112/512 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112/512 may be programmed by one or more additional instructions that may perform some or all of the functionality attributed herein to one of the instructions.

The various instructions described herein may be stored in a storage device 114/514, which may comprise random access memory (RAM), read only memory (ROM), and/or other memory. The storage device may store the computer program instructions (e.g., the aforementioned instructions) to be executed by processor 112/512 as well as data that may be manipulated by processor 112/512. The storage device may comprise floppy disks, hard disks, optical disks, tapes, or other storage media for storing computer-executable instructions and/or data.

The various components illustrated in FIGS. 1/5 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIGS. 1/5 and other drawing Figures, different numbers of entities than depicted may be used. Furthermore, according to various implementations, the components described herein may be implemented in hardware and/or software that configure hardware.

The various databases 134/534 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Throughout the above description, the terms (IP) Multicast and TCP/IP are used. These are widely used and widely-understood "standard" network protocols. The use of these specific terms is not meant to limit the applicability of the mechanism to just these specific network protocols. In the context of this document the term multicast maybe understood to be any current or future network protocol in which the sender places a single copy of a message on the electronic network, regardless of the number of recipients to which the message will be delivered. Similarly, unless otherwise noted in the text (particularly with respect to reliability), TCP/IP is simply used to denote any protocol in which there is generally one copy of message per recipient placed on the electronic network by the sender.

Throughout the preceding text the term encryption key may be used to refer to both the key used to encrypt the data, and the key used to decrypt it. In an asymmetric encryption scheme there would be a pair of distinct keys: the decryption key would be the one sent to the recipients (market participants), the encryption key would be used by the sender to encrypt the data. In the preceding text it is to be understood the "encryption key" may refer to either the key used to encrypt the data, or the key used to decrypt it, depending on the context and these keys maybe the same (as in a symmetric encryption scheme) or distinct (as in an asymmetric encryption scheme).

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

The invention claimed is:

1. A computer implemented method of distributing credit-screened market data, the method being implemented in a computer system having one or more physical processors programmed with computer program instructions that, when executed by the one or more physical processors, cause the computer system to perform the method, the method comprising:

provisioning a plurality of private multicast channels and assigning at least a first private multicast channel of the plurality of private multicast channels to a first data recipient and at least a second private multicast channel of the plurality of private multicast channels to a second data recipient;

generating, by the computer system, first credit-screened market data for the first data recipient based on first credit data and market data and second credit-screened market data for the second data recipient based on second credit data and the market data;

generating, by the computer system, an encryption key;

encrypting, by the computer system, at least a portion of the first and a portion of the second credit-screened market data using the encryption key;

transmitting, by the computer system, the encrypted first credit-screened market data to the first data recipient over the first private multicast channel;

transmitting, by the computer system, the encrypted second credit-screened market data to the second data recipient over the second private multicast channel;

determining, by the computer system, that the encrypted first credit-screened market data has been sent to the first data recipient and that the encrypted second credit-screened market data has been sent to the second data recipient; and transmitting, by the computer system and in response to the determination that the encrypted first credit-screened market data has been sent to the first data recipient and that the encrypted second credit-screened market data has been sent to the second data recipient, the encryption key simultaneously to the first data recipient and the second data recipient over a multicast channel.

2. The method of claim 1, the method further comprising:
decrypting, by the first and second data recipients, the encrypted first and second credit-screened market data using the encryption key so that the encrypted first and second credit-screened market data are accessible to the first and second data recipients.

3. The method of claim 1, the method further comprising:
defining, by the computer system, the first multicast channel by associating the first data recipient with particular ports or IP addresses of a network switch of the computer system; and
defining, by the computer system, the second multicast channel by associating the second data recipient with particular ports or IP addresses of the network switch.

4. The method of claim 1, the method further comprising:
receiving, by the computer system, an association by the first data recipient of an instrument or credit code to the first multicast channel; and
receiving, by the computer system, an association by the second data recipient of an instrument or credit code to the second multicast channel;
wherein the generating of the first credit-screened market data for the first data recipient and the second credit-screened market data for the second data recipient is performed based on a triggering event determined by the computer system, and further comprises generating the first and second credit-screened market data using separate screening and distribution processes on an instrument-by-instrument basis based at least in part on the associations by the first and second data recipients of instruments or credit codes to the first and second multicast channels.

5. The method of claim 1, the method further comprising:
receiving, by the computer system, a specification from the first data recipient that the encrypted first credit-screened market data be sent to the first data recipient over the first private multicast channel; and
receiving, by the computer system, a specification from the second data recipient that the encrypted second credit-screened market data be sent to the second data recipient over the second private multicast channel.

6. The method of claim 1, wherein:
generating the first credit-screened market data and second credit-screened market data further comprises assigning a first instrument to a first screening and distribution process and assigning a second instrument to a second screening and distribution process;
generating the encryption key further comprises providing input data to the first and second screening and distribution processes and generating the same encryption key in both processes; and
encrypting at least the portions of the first and second credit-screened market data using the encryption key comprises encrypting the first credit-screened market data by the first screening and distribution process using the encryption key and encrypting the second credit-screened market data by the second screening and distribution process using the encryption key.

7. A system of distributing credit-screened market data, the system comprising:
a computer system having one or more physical processors programmed with computer program instructions to:
provision a plurality of private multicast channels and assign at least a first private multicast channel of the plurality of private multicast channels to a first data recipient and at least a second private multicast channel of the plurality of private multicast channels to a second data recipient;
generate first credit-screened market data for the first data recipient based on first credit data and market data and second credit-screened market data for the second data recipient based on second credit data and the market data;
generate an encryption key;
encrypt at least a portion of the first and a portion of the second credit-screened market data using the encryption key;
transmit the encrypted first credit-screened market data to the first data recipient over the first private multicast channel;
transmit the encrypted second credit-screened market data to the second data recipient over the second private multicast channel;
determine that the encrypted first credit-screened market data has been sent to the first data recipient and that the encrypted second credit-screened market data has been sent to the second data recipient; and
transmit, in response to the determination that the encrypted first credit-screened market data has been sent to the first data recipient and that the encrypted second credit-screened market data has been sent to the second data recipient, the encryption key simultaneously to the first data recipient and the second data recipient over a multicast channel.

8. The system of claim 7, wherein the computer system is further programmed to:
decrypt, at the first and second data recipients, the encrypted first and second credit-screened market data using the encryption key so that the encrypted first and second credit-screened market data are accessible to the first and second data recipients.

9. The system of claim 7, wherein the computer system is further programmed to:
  define the first multicast channel by associating the first data recipient with particular ports or IP addresses of a network switch of the computer system; and
  define the second multicast channel by associating the second data recipient with particular ports or IP addresses of the network switch.

10. The system of claim 9, wherein the computer system is further programmed to:
  receive an association by the first data recipient of an instrument or credit code to the first multicast channel; and
  receive an association by the second data recipient of an instrument or credit code to the second multicast channel;
  wherein the generating of the first credit-screened market data for the first data recipient and the second credit-screened market data for the second data recipient is performed based on a triggering event determined by the computer system, and further comprises generating the first and second credit-screened market data using separate screening and distribution processes on an instrument-by-instrument basis based at least in part on the associations by the first and second data recipients of instruments or credit codes to the first and second multicast channels.

11. The system of claim 7, wherein the computer system is further programmed to:
  receive a specification from the first data recipient that the encrypted first credit-screened market data be sent to the first data recipient over the first private multicast channel; and
  receive a specification from the second data recipient that the encrypted second credit-screened market data be sent to the second data recipient over the second private multicast channel.

12. The system of claim 7, wherein:
  to generate the first credit-screened market data and second credit-screened market data, the computer system is further programmed to assign a first instrument to a first screening and distribution process and assign a second instrument to a second screening and distribution process;
  to generate the encryption key, the computer system is further programmed to provide input data to the first and second screening and distribution processes and generate the same encryption key in both processes; and
  to encrypt at least the portions of the first and second credit-screened market data using the encryption key, the computer system is further programmed to encrypt the first credit-screened market data by the first screening and distribution process using the encryption key and encrypt the second credit-screened market data by the second screening and distribution process using the encryption key.

13. A non-transitory computer readable storage device storing computer instructions for distributing credit screened market data, the instructions, when executed by one or more physical processors of a computer system, cause the computer system to:
  provision a plurality of private multicast channels and assign at least a first private multicast channel of the plurality of private multicast channels to a first data recipient and at least a second private multicast channel of the plurality of private multicast channels to a second data recipient;
  generate first credit-screened market data for the first data recipient based on first credit data and market data and second credit-screened market data for the second data recipient based on second credit data and the market data;
  generate an encryption key;
  encrypt at least a portion of the first and a portion of the second credit-screened market data using the encryption key;
  transmit the encrypted first credit-screened market data to the first data recipient over the first private multicast channel;
  transmit the encrypted second credit-screened market data to the second data recipient over the second private multicast channel;
  determine that the encrypted first credit-screened market data has been sent to the first data recipient and that the encrypted second credit-screened market data has been sent to the second data recipient; and
  transmit, in response to the determination that the encrypted first credit-screened market data has been sent to the first data recipient and that the encrypted second credit-screened market data has been sent to the second data recipient, the encryption key simultaneously to the first data recipient and the second data recipient over a multicast channel.

14. The non-transitory computer readable storage device of claim 13, wherein the instructions further cause the computer system to:
  decrypt, at the first and second data recipients, the encrypted first and second credit-screened market data using the encryption key so that the encrypted first and second credit-screened market data are accessible to the first and second data recipients.

15. The non-transitory computer readable storage device of 13, wherein the instructions further cause the computer system to:
  define the first multicast channel by associating the first data recipient with particular ports or IP addresses of a network switch of the computer system; and
  define the second multicast channel by associating the second data recipient with particular ports or IP addresses of the network switch.

16. The non-transitory computer readable storage device of 15, wherein the instructions further cause the computer system to:
  receive an association by the first data recipient of an instrument or credit code to the first multicast channel; and
  receive an association by the second data recipient of an instrument or credit code to the second multicast channel;
  wherein the generating of the first credit-screened market data for the first data recipient and the second credit-screened market data for the second data recipient is performed based on a triggering event determined by the computer system, and further comprises generating the first and second credit-screened market data using separate screening and distribution processes on an instrument-by-instrument basis based at least in part on the associations by the first and second data recipients of instruments or credit codes to the first and second multicast channels.

17. The non-transitory computer readable storage device of 13, wherein the instructions further cause the computer system to:

receive a specification from the first data recipient that the encrypted first credit-screened market data be sent to the first data recipient over the first private multicast channel; and receive a specification from the second data recipient that the encrypted second credit-screened market data be sent to the second data recipient over the second private multicast channel.

18. The non-transitory computer readable storage device of claim 13, wherein to generate the first credit-screened market data and second credit-screened market data, the instructions further cause the computer system to assign a first instrument to a first screening and distribution process and assign a second instrument to a second screening and distribution process;

to generate the encryption key, the instructions further cause the computer system to provide input data to the first and second screening and distribution processes and generate the same encryption key in both processes; and to encrypt at least the portions of the first and second credit-screened market data using the encryption key, the instructions further cause the computer system to encrypt the first credit-screened market data by the first screening and distribution process using the encryption key and encrypt the second credit-screened market data by the second screening and distribution process using the encryption key.

\* \* \* \* \*

UNITED STATES PATENT AND TRADEMARK OFFICE
CERTIFICATE OF CORRECTION

| | | |
|---|---|---|
| PATENT NO. | : 12,211,099 B2 | Page 1 of 1 |
| APPLICATION NO. | : 17/840295 | |
| DATED | : January 28, 2025 | |
| INVENTOR(S) | : Hayden Paul Melton | |

It is certified that error appears in the above-identified patent and that said Letters Patent is hereby corrected as shown below:

In the Claims

Column 34, Line 39, (Claim 15, Line 2), change "of 13," to --of claim 13,--;

Column 34, Line 48, (Claim 16, Line 2), change "of 15," to --of claim 15,--;

Column 35, Line 2, (Claim 17, Line 2), change "of 13," to --of claim 13,--.

Signed and Sealed this
Twenty-second Day of April, 2025

Coke Morgan Stewart
*Acting Director of the United States Patent and Trademark Office*